US008473176B2

(12) United States Patent
Youngquist et al.

(10) Patent No.: US 8,473,176 B2
(45) Date of Patent: Jun. 25, 2013

(54) AIRCRAFT MONITORING EQUIPMENT

(75) Inventors: John S. Youngquist, Niagara Falls (CA); John W. Toulmin, Fort Erie (CA)

(73) Assignee: John S. Youngquist, Niagara Falls (CA)

( * ) Notice: Subject to any disclaimer, the term of this patent is extended or adjusted under 35 U.S.C. 154(b) by 684 days.

(21) Appl. No.: 12/385,395

(22) Filed: Apr. 7, 2009

(65) Prior Publication Data

US 2009/0306839 A1 Dec. 10, 2009

Related U.S. Application Data

(60) Provisional application No. 61/064,976, filed on Apr. 7, 2008.

(51) Int. Cl.
*G06F 19/00* (2006.01)
*G01C 23/00* (2006.01)

(52) U.S. Cl.
USPC .......... 701/101; 701/102; 701/103; 701/29.2; 701/34.4; 123/294; 123/169 R; 73/118.01

(58) Field of Classification Search
USPC .................. 701/103, 108, 99, 101, 102, 29.1, 701/29.2, 34.4; 123/563, 643, 649, 294, 169, 123/169 R; 73/119, 118.1, 115, 118.01
See application file for complete search history.

(56) References Cited

U.S. PATENT DOCUMENTS

| | | | |
|---|---|---|---|
| 3,366,108 A * | 1/1968 | Blackburn et al. ....... | 128/205.12 |
| 4,114,442 A * | 9/1978 | Pratt ............................. | 374/113 |
| 4,918,619 A * | 4/1990 | Orloff et al. .................... | 702/52 |
| 6,271,769 B1 | 8/2001 | Frantz | |
| 6,382,159 B1 * | 5/2002 | Shifflette .................. | 123/169 V |
| 6,940,425 B2 | 9/2005 | Frantz | |
| 7,249,460 B2 * | 7/2007 | Nearhoof, Jr. .................. | 60/742 |
| 7,657,330 B2 * | 2/2010 | Morrison ........................ | 700/19 |
| 7,725,238 B2 * | 5/2010 | Perkins .......................... | 701/103 |
| 7,954,766 B2 * | 6/2011 | Brainard et al. ............... | 244/194 |
| 7,979,192 B2 * | 7/2011 | Morrison et al. ............... | 701/99 |
| 2002/0187459 A1 * | 12/2002 | Stockman ........................ | 434/29 |
| 2003/0048203 A1 * | 3/2003 | Clary et al. .................... | 340/945 |
| 2003/0084713 A1 * | 5/2003 | Imoehl ........................ | 73/119 A |
| 2004/0050359 A1 * | 3/2004 | Imoehl ........................... | 123/295 |
| 2005/0137778 A1 * | 6/2005 | Ingram et al. ................. | 701/103 |
| 2006/0113129 A1 * | 6/2006 | Tabata .......................... | 180/65.2 |
| 2007/0000247 A1 * | 1/2007 | Perkins .......................... | 60/565 |
| 2007/0142980 A1 * | 6/2007 | Ausman et al. .................... | 701/3 |
| 2007/0260374 A1 * | 11/2007 | Morrison et al. .............. | 701/35 |

OTHER PUBLICATIONS

Advanced Flight Systems, Inc., 12 pages of screen/model/system options/descriptions for various EFIS/engine monitor screens, www.Advanced-Flight-Systems.com, (2008).
Electronics International, Inc., 2 pages of options/descriptions of glass panel engine monitors for aircraft, www.Buy-Ei.com, (2008).
Electronics International, Inc., 1 page illustrating ultimate bar graph (UBG) engine analyzer, specifications, prices and options (May 1, 2006).

(Continued)

*Primary Examiner* — Ronnie Mancho
(74) *Attorney, Agent, or Firm* — Nixon & Vanderhye PC

(57) ABSTRACT

An aircraft monitoring system uses aircraft engine and system transducers to monitor critical engine and aircraft system parameters. Simple controls and graphical user interfaces facilitate the display of different kinds of critical information to the pilot. Such data may also be recorded for later downloading and analysis.

57 Claims, 27 Drawing Sheets

OTHER PUBLICATIONS

Garmin® G1000™ engine indication system (EIS) pilot's guide for the Beechcraft A36/G36, 12 pages (Jul. 22, 2005).

Insight, 7 pages illustrating graphic engine monitor (GEM) which describe various features and specifications of several models, (1995).

J.P. Instruments (JPI), 6 pages extracted from the Internet illustrating engine analyzers for EDM 700 (2008).

J.P. Instruments (JPI), 6 pages extracted from the Internet illustrating engine analyzers for EDM 800 (2008).

J.P. Instruments (JPI), 4 pages extracted from the Internet illustrating engine analyzers for EDM 900 (2008).

J.P. Instruments (JPI), 5 pages extracted from the Internet illustrating primary instruments for EDM 930 (2008).

Vertical Power, 20 pages extracted from the Internet illustrating various modes and display capabilities for circuitry control and protection (2008).

Xerion Avionix LLC, 2 pages describing general and operational specifications for cockpit resource management (CRM 2100), www.XerionAvionix.com, (2007).

Xerion Avionix LLC, 3 pages describing general and operational specifications for engine monitoring system (CRM 2120), www.XerionAvionix.com, (2008).

\* cited by examiner

```
┌─────────────────────────────────┐
│  PROBE DIAGNOSTIC SCREEN        │
│                                 │
│  Set measure resistance flag    │
│                                 │
│  Fill array with resistance values │
│                                 │
│  Test values against limitations │
│                                 │
│  Display values based on limit tests │
│    Color: red for outside limit │
│    Color: green for inside limit │
│                                 │
│  Read lower knob and button     │
│                                 │
│  Adjust user defined limitations │
└─────────────────────────────────┘
            ─ 521
```

FIG. 5O

```
┌─────────────────────────────────┐
│  ENGINE MANAGEMENT SCREEN       │
│                                 │
│  Fill array with Thermo Couple voltages │
│                                 │
│  Convert array mv to temperature values │
│                                 │
│  Figure column height from temperature │
│                                 │
│  Test CHT against limits to select color │
│                                 │
│  Display column and associated temp │
│                                 │
│  Repeat above for all EGT,CHT,TIT │
│                                 │
│  Display peak indicator and temperature │
│                                 │
│  Label column numbers           │
│                                 │
│  Display related parameters: mp ff rpm.... │
└─────────────────────────────────┘
         ─ 520
```

TEMPERATURE VARIATION ANALYSIS

Sample and buffer EGT once/sec

Perform FFT spectral analysis

Display spectrum of all or sel cyl

Read lower knob and button

Adjust user defined cylinder numbers

VIBRATION ANALYSIS

Sync vibration measurements to RPM

Receive xyz data triplets from accel

Perform FFT when data buffer is full

Display spectrum

Read lower knob and button

Adjust user defined axis numbers

FIG. 5Q

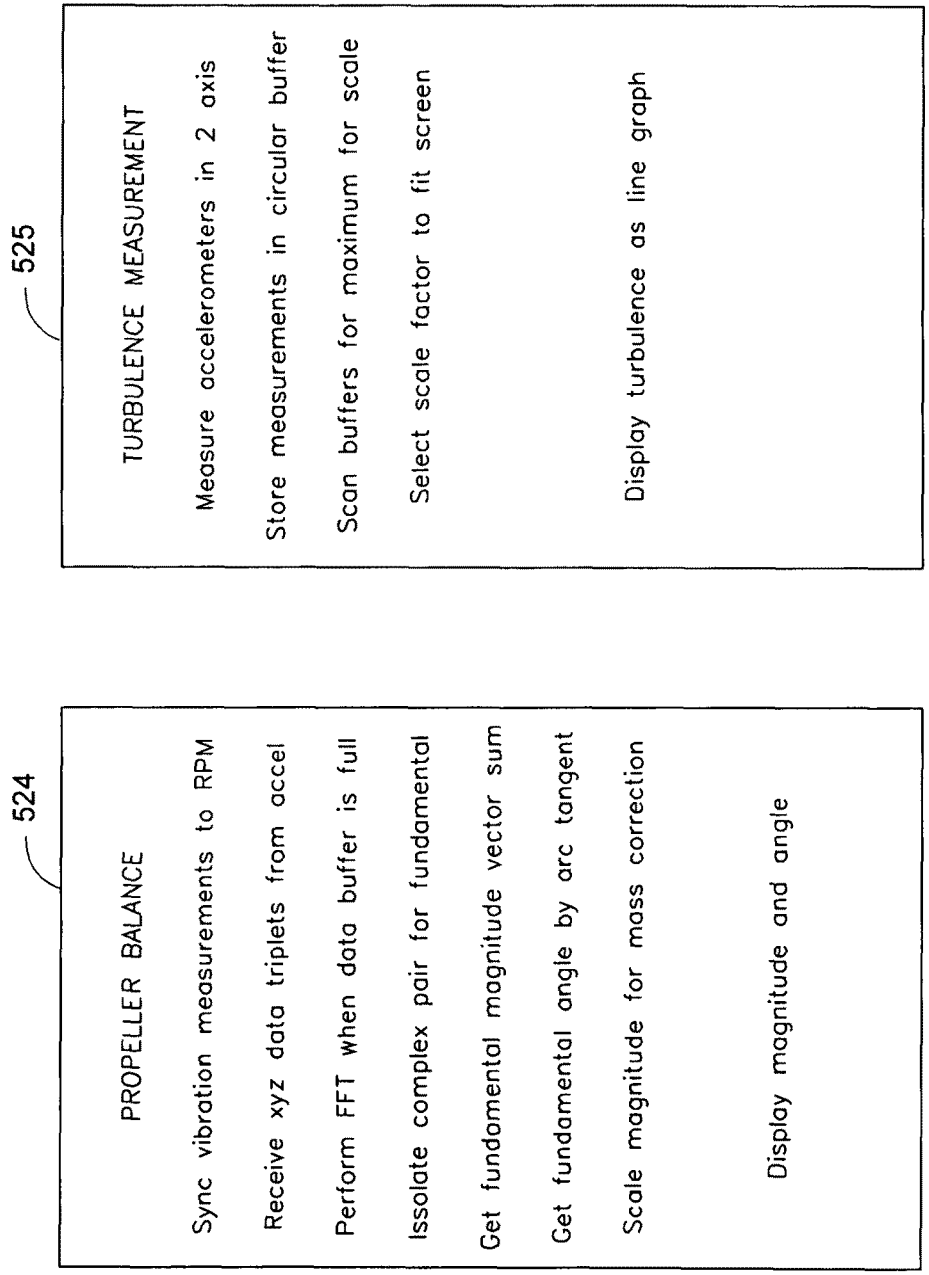

PROPELLER BALANCE — 524

- Sync vibration measurements to RPM
- Receive xyz data triplets from accel
- Perform FFT when data buffer is full
- Isssolate complex pair for fundamental
- Get fundomental magnitude vector sum
- Get fundamental angle by arc tangent
- Scale magnitude for mass correction
- Display magnitude and angle

FIG. 5R

TURBULENCE MEASUREMENT — 525

- Measure accelerometers in 2 axis
- Store measurements in circular buffer
- Scan buffers for maximum for scale
- Select scale factor to fit screen
- Display turbulence as line graph

FIG. 5S

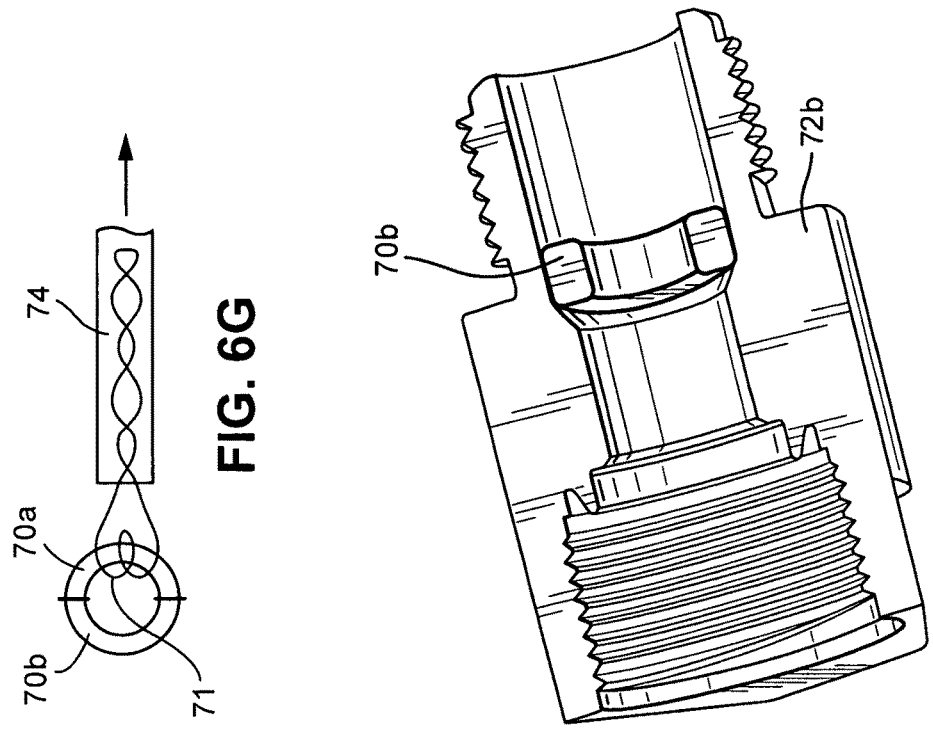
FIG. 6G
FIG. 6H
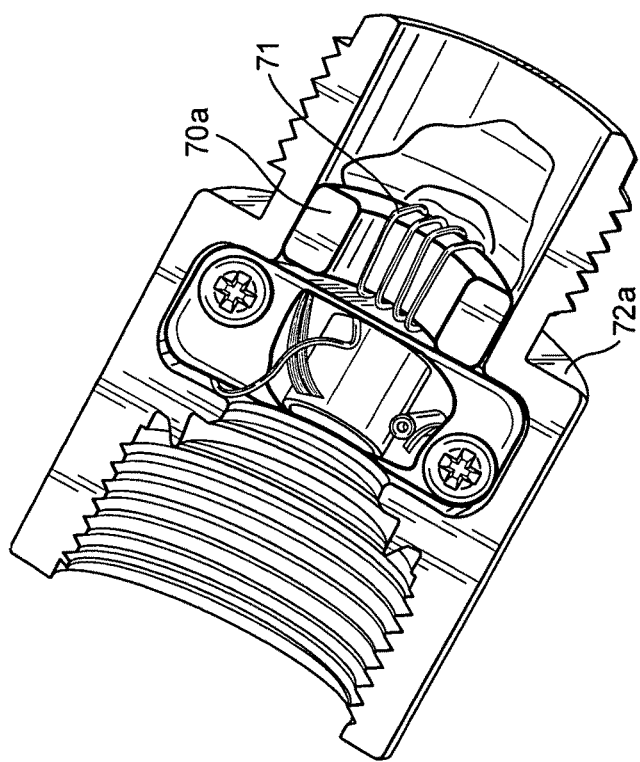
FIG. 6F

AIRCRAFT MONITORING EQUIPMENT

RELATED APPLICATION

This application hereby claims priority rights under 35 U.S.C. §119(e) based on provisional application Ser. No. 61/064,976 filed Apr. 7, 2008.

BACKGROUND

1. Technical Field

This invention deals generally with monitoring and displaying aircraft operational parameters, especially those associated with an aircraft engine. A display of similar general type is available as a Graphic Engine Monitor (GEM®— registered trademark of Insight Avionics, Inc.) and typically comprises a main unit located on the aircraft cockpit panel for display of real-time and/or historical information concerning the aircraft and/or engine. More generally applicable fuel tank monitoring, thermocouple resistance measuring techniques and vibration/balance analysis techniques are also addressed hereinbelow.

2. Related Art

Aircraft monitoring instruments have been available for many years from a number of manufacturers. In general, prior monitors have included a bar graph for each cylinder of a reciprocating aircraft engine simultaneously showing exhaust gas temperature (EGT) and cylinder head temperature (CHT). Data concerning cooling trends, differential temperatures between cylinders, fuel flow (FF), RPM, fuel reserve, total aircraft fuel used and/or remaining, outside air temperature, intake air temperature, percent brake horsepower (HP) being developed by the engine and other aircraft performance parameters have been accumulated and displayed. Typically, the bar graphs may be created by discrete display elements arranged in a linear array bar format for each cylinder (e.g., the overall lighted bar length/height representing EGT and an unlighted element therewithin representing CHT). Digital readouts of other data have been available and historical data storage/readout of such parameters has been provided for downloading to a laptop or other computer and later analysis as will be appreciated by those in the art.

Some prior monitors also provide visual indicators for assisting the pilot in leaning the engine (either rich of peak (ROP) or lean of peak (LOP)) for sustained operation (e.g., after climb-out to altitude).

Some more recent monitors have provided increased resolution display using television-type raster-scanned display screens—but typically of a relatively larger size than is easily fit within the standard available spaces (e.g., a 2¼-inch diameter hole) on an aircraft panel (at least for legacy aircraft retrofit purposes).

BRIEF SUMMARY

A presently preferred exemplary embodiment conveniently fits within a standard legacy aircraft panel aperture— and may, for example, be a convenient replacement for earlier similar-sized monitors (e.g., assuming that the existing engine and/or other aircraft transducers are compatible). This exemplary embodiment provides enhanced full color display resolution (e.g., a 1.5 inch square LCD screen of 320×240 pixels) with excellent readability even on a relatively smaller scale display screen and also provides numerous novel features.

For example, enhanced assistance (including color-coded graphic displays) can be given to a pilot for leaning the aircraft fuel mixture (for either rich of peak (ROP) or lean of peak (LOP) engine operation). Thermocouple circuits can be readily tested with results shown on a diagnostic screen. Using a special cylinder-specific spark RPM detector, numerous improved diagnostics are facilitated. For example, engine vibrations can be quantified and visually displayed in a format which permits easy pilot interpretation even with changing engine speeds. Location of undesirable vibration sources may be more easily located and/or analyzed. Propeller balance and/or the best lean of peak operation for achieving minimum engine roughness may be facilitated.

One or more internal pressure sensors permit altitude logging, vacuum failure alarming, and manifold pressure monitoring/logging. G-metering of live airframe loads, GPS data (e.g., ground speed, position, altitude, way points, etc.) and air data computer outputs may also be monitored (e.g., via an RS-232 serial buss) and/or logged. Approximate altitude information can also be derived using outside air temperature (OAT) and ambient atmospheric pressure (nominal lapse rate of 2° C. per thousand feet of altitude). If logged (e.g., on a removable SD card), such data may provide an economical form of "black box" recorder even for small airplanes.

A fuel tank selector position switch/sensor input (e.g., an appropriately mounted micro-switch) can also permit independent fuel utilization/totalization for each fuel tank—as well as estimation of fuel endurance for each individual aircraft tank. For example, the display can include flight time remaining on the currently selected tank, time to soonest tank exhaustion, exhaustion time on the currently selected tank and the like.

A video quality LCD display (e.g., 320×240 pixels over a 1.5 inch square screen) permits playback of video tutorials, movies, power-point-like presentations (including voice) from video data stored on a removable SD card. Such can also be downloaded onto the SD card from the internet or other sources.

Fuel flow at peak EGT can be logged and displayed separately for each cylinder—which effectively permits fuel injection nozzle analysis. A leaning fuel flow threshold value can be set and displayed—as can the variance in operating EGT with respect to peak EGT (including whether the variance is ROP or LOP). Target or guidance fuel flow amounts can also be displayed for various phases of flight (e.g., climbing or level at or from different altitudes).

Relatively slow periodic variation in EGT for a given cylinder (e.g., one cycle every minute or two) may be useful for detecting and annunciating potential or actual valve-related engine faults.

Airframe loading due to turbulence and/or landing shock forces may also be detected and displayed based on an internal accelerometer.

Although capable of providing sophisticated and complex pilot assistance, the exemplary embodiment can be simply controlled using any desired form of user-controllable input (e.g., as in the exemplary embodiment using two control knobs which each operate combination rotary and push button switches). At least some switch operations (or other user-controlled input) may also be software-controlled to provide different functionality in different display contexts.

As will be understood, the various novel features of this invention may be utilized as individual features or in any desired combination or permutation in the design of a particular aircraft monitor embodiment—including, in at least some instances, in a context other than engine monitoring (e.g., monitoring thermocouple resistance parameters, possibly while still in use for temperature measurement; monitoring vibration and/or balance of helicopter rotors, gear boxes, etc., or other rotating members in other environments; obtaining a trigger pulse synchronized to spark plug ignition time; monitoring of separate fuel tanks, etc.).

The exemplary embodiment to be described in more detail below may include, for example, some or all of the following features:

Growth and expansion of function
New perspectives and dimensions into aircraft performance
Bright, bold, full-color display with many screens and functions
Essentially unlimited data log space (never run out of memory space)
Integrate/log of data from the instrument as well as from external, TAS Air Data and GPS sources
Removable SD card to store engine, air, winds aloft and fuel data (no more lost data)—or downloaded audio-video tutorials or other programs
Aircraft life history stored directly on the removable SD card in PC-compatible form
Specific functionality for safe lean of peak operation without detonation
Engine vibration measurement and analysis
Specialized analysis for propeller balance, turbulence and landing shock
Oil temperature and pressure
Manifold pressure, fuel flow and RPM
OAT (outside air temperature)
Carburetor and alternator temperature
Compatible with prior installations (easy upgrade)
Altitude logging with internal pressure sensor—e.g., for correlation of data log
3-axis logging internal G-meter—for all live airframe loads—pilot-induced, aerobatics and turbulence
Built-in audio-visual tutorial with pictures, movies, powerpoint-like presentations and/or voice
Data-communication with GPS and air-data-computer to include in data log
Fuel tank-selector detection for independent individual fuel tank use totalization and individual fuel tank endurance predictions (in terms of fuel, flight time, etc.)
Leaning assistance screen and functionality
Fuel flow at peak EGT during leaning captured and displayed for each cylinder
Fuel injection nozzle analysis and logging
Rich/lean detection and display
Leaning threshold value setting and display
Color-coded CHT/EGT digital temperature display below CHT/EGT bar display
Measurement/logging/display of thermocouple probe resistances (even while in use)
Thermocouple resistance limit test and display of out-of-limit values
Automatic data logging of thermocouple resistance at each turn-on time
Fuel flow meter module mounted on engine includes co-located vibration sensor with sample times synchronized to RPM measured at specific engine rotational position
Vibration measurement and signal enhancement in remote engine-mounted fuel flow transducer module
Digital vibration data transmission between engine compartment accelerometer and instrument in cabin panel
Long-term frequency spectral analysis of EGT for exhaust valve problem detection
In-flight propeller balance measurement
Cylinder-specific ignition sensor for timing horsepower calculations (e.g., at take-off and/or climb for metered fuel flow and perhaps other parameters)
Guidance fuel flow displays as recommended for different altitudes and/or flight conditions
Red FF display if off target from recommended guidance FF
Special lean of peak functionality
Unparalleled ease of operation
Nozzle balance analysis every time
Detailed vibration analysis
Safely operate lean of peak
Detect early stage mechanical problems
Prevent catastrophic engine failures
In-flight real-time propeller balance
Achieve amazing engine smoothness
Diagnose propeller problems
Detect propeller/airframe ice
Continuous thermocouple (TC) probe diagnosis
Confirm system integrity
Save time trouble-shooting
Extensive measurement coverage
Simultaneous EGT, CHT, TIT (turbine inlet temperature)
Bus voltage, instrument vacuum
Fuel flow, fuel used alternator temperature, OAT
Manifold pressure, RPM, oil temperature, oil pressure
Sophisticated data logging
Unlimited storage on standard SD camera card
Integrates data from multiple sources
PC compatible files and directories
Fully compatible upgrade
Plug and play with prior similar instruments
No panel or wiring changes

BRIEF DESCRIPTION OF THE DRAWINGS

These as well as other objects and advantages will be better appreciated by careful study of the following more detailed description of an exemplary embodiment in conjunction with the accompanying drawings, of which:

FIGS. 6A-6J depict exemplary cylinder spark detectors for achieving synchronization with a predetermined rotational position of the crankshaft.

DETAILED DESCRIPTION OF EXEMPLARY EMBODIMENTS

As will be appreciated, the specific exemplary embodiment to be described in more detail below is merely one example of this invention incorporating an exemplary combination of various features. As those in the art will appreciate, different embodiments may incorporate different combinations of such features and may also depart from the details of this particular embodiment, while still retaining many of the novel advantages and features of this invention.

Lean Screen (see FIGS. 2A-2C, 2H, 2I, 2J, 2K, 2L)

Each cylinder (e.g., of an exemplary four-cylinder reciprocating piston aircraft engine here depicted) has its own display column that displays both EGT and CHT simultaneously. The columns are numbered with cylinder number. Both temperatures are displayed graphically and numerically. Numbers below the column are color-keyed actual temperatures as shown on the bar. CHT is shown in green when in allowable range and then the bar and numeric indication turn red when exceeding the redline limit. A red line also indicates the "red line" CHT limit across the bar at the appropriate height. During an engine leaning process (e.g., from a full rich take-off FF at sea level), the EGT column initially rises pushing a peak indicator above it. The exemplary peak indicator is a rectangular line box of column width that remains at the maximum EGT reached during leaning. Once the column drops below peak, a temperature difference numerical indication appears in the rectangle showing the temperature difference of the current temperature below the peak EGT. As each cylinder EGT rises, the current fuel flow is also digitally displayed in black characters in the top of the corresponding column. Once the cylinder goes past peak EGT, the displayed fuel flow value is frozen at peak EGT (i.e., captured for continued display). If the current fuel flow is lower than this captured peak EGT flow, then the temperature box would show "L25" for example if the temperature was 25° down on the lean side of peak. On the other hand, if the current fuel flow was greater than at peak EGT, then "R25" would be shown to indicate the operation at 25° on the rich side of peak. Ideally, all cylinders will reach peak EGT simultaneously, but of course that will not happen in actual engine operation. The variation in the cylinder-by-cylinder peak EGT fuel flow numbers will identify how close they are to each other. The peak indications may be reset by pushing the bottom knob to re-lean the engine. The top row(s) of digital display indications show other monitored parameters such as RPM, manifold pressure and fuel flow.

Figure 1:
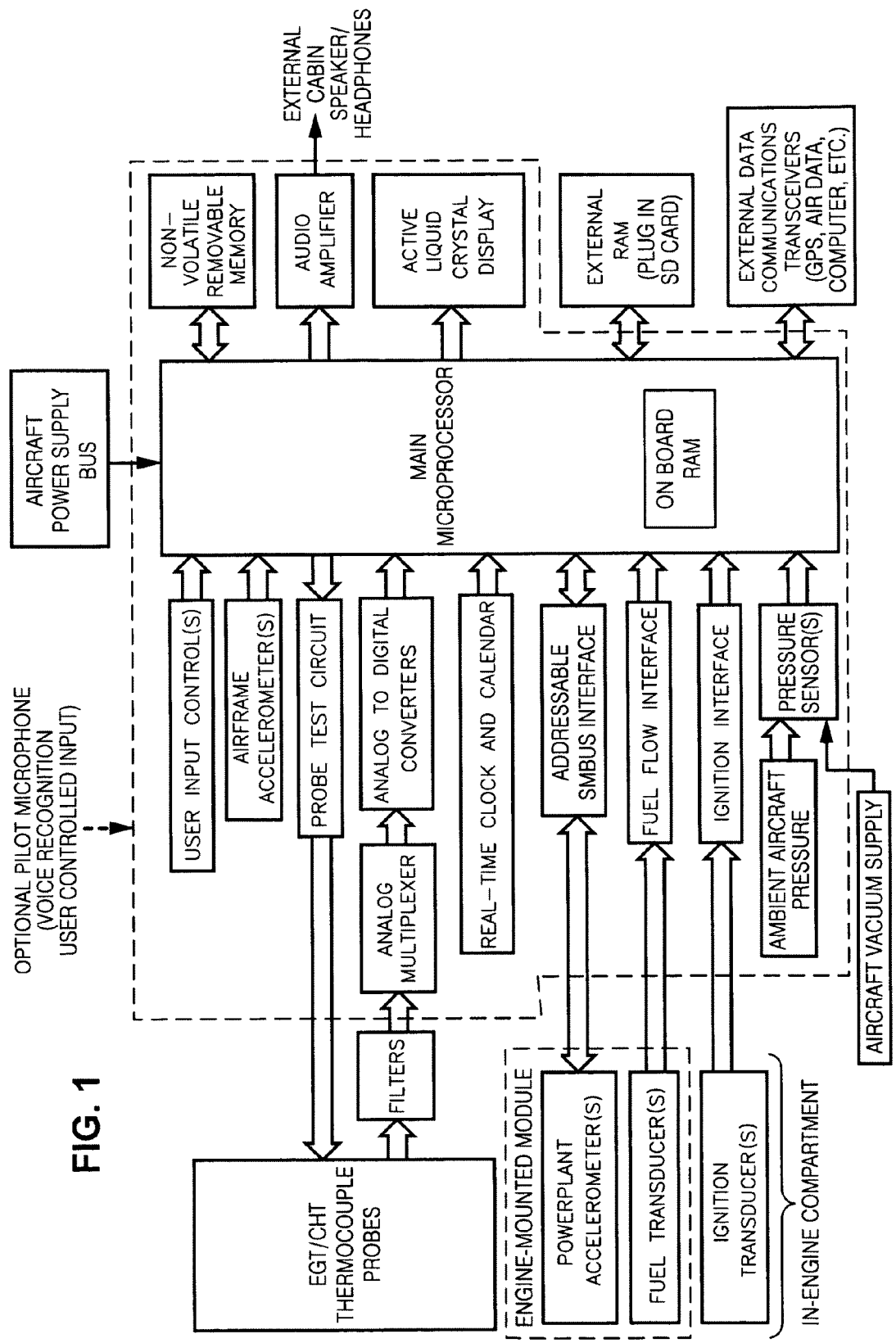
FIG. 1 is a general block diagram of an exemplary engine monitor system.
Figure 2A:
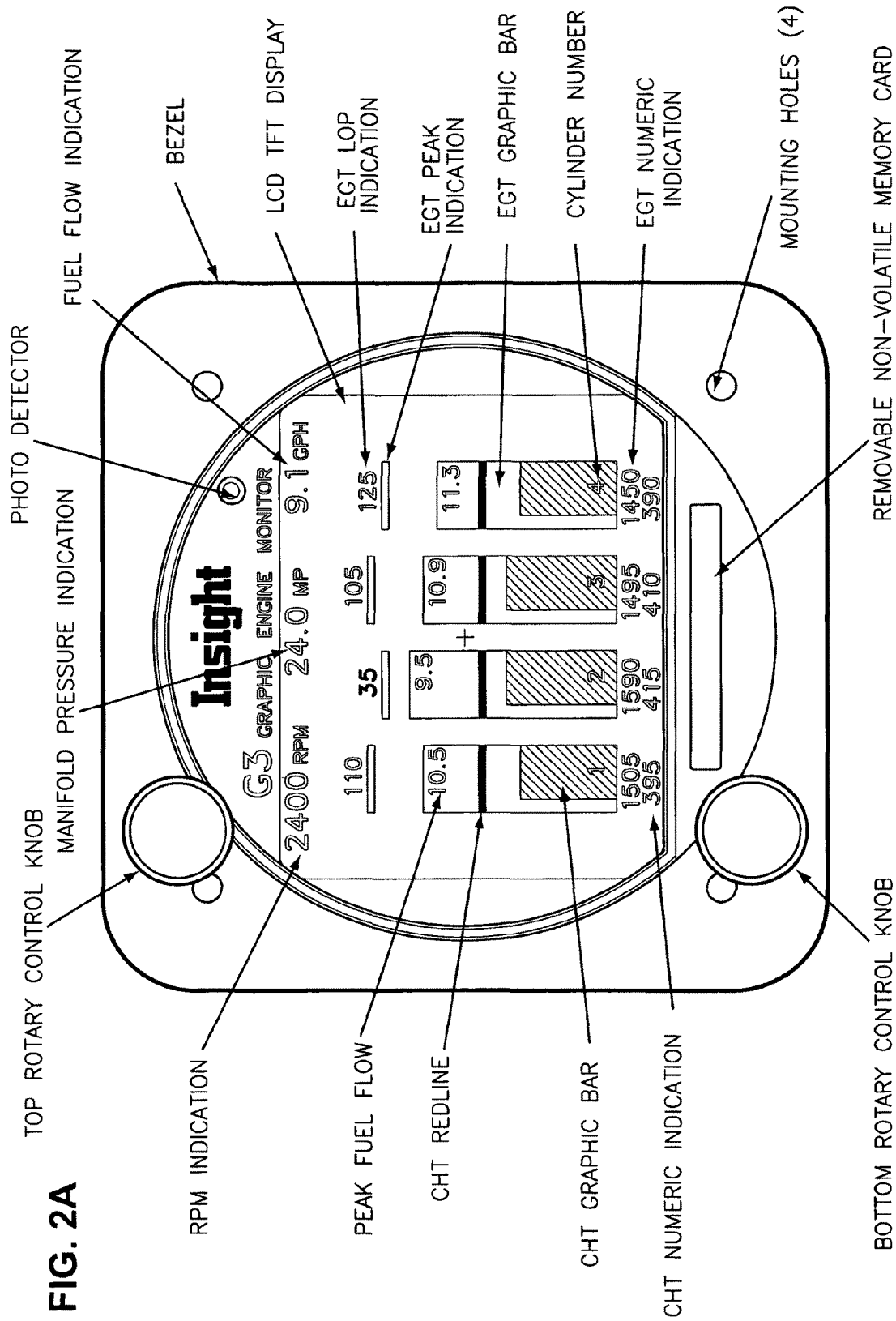
FIGS. 2A-2N provide exemplary graphical displays for various exemplary modes of operation for the system depicted in FIG. 1.
Figure 2C:
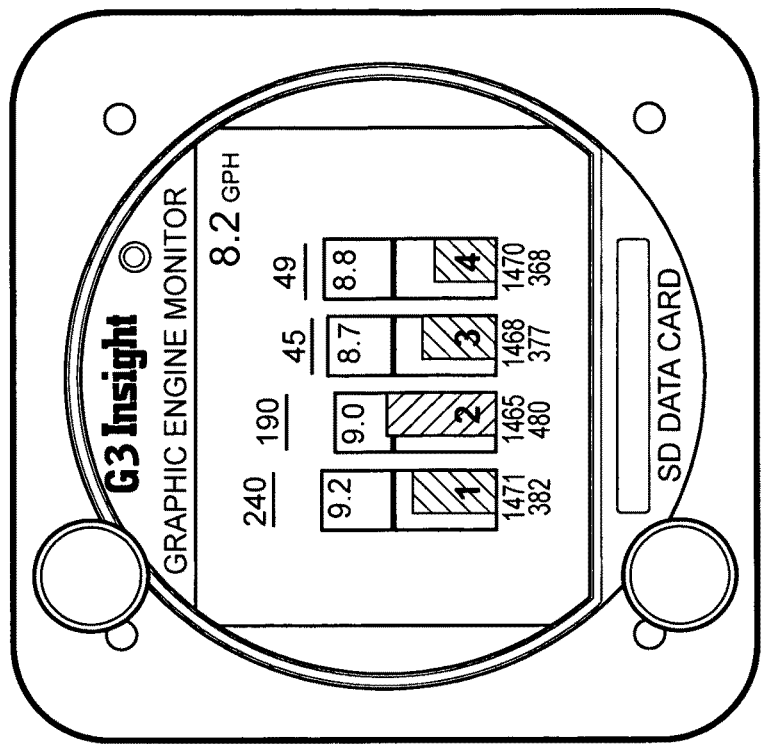
Figure 2B:
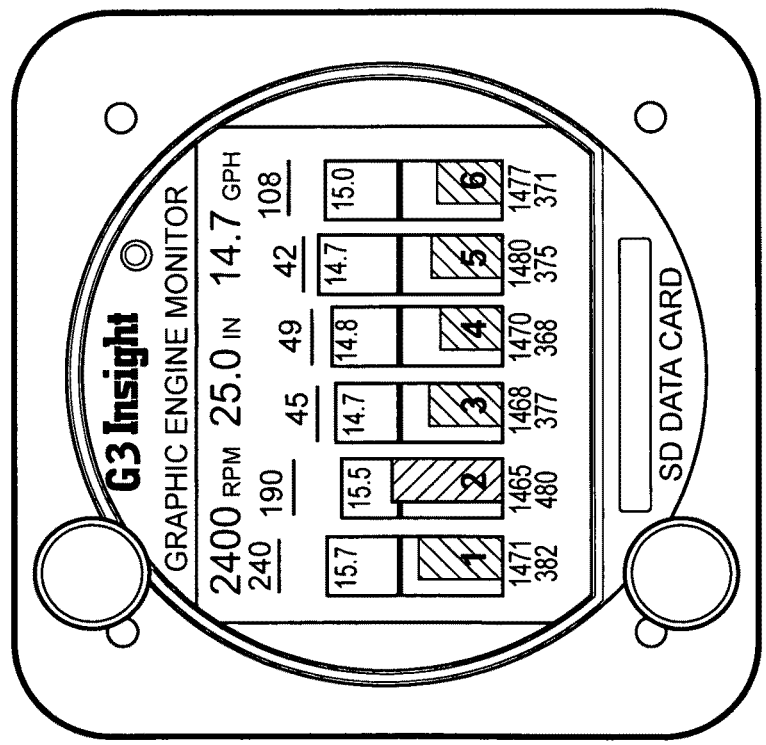
Figure 2E:
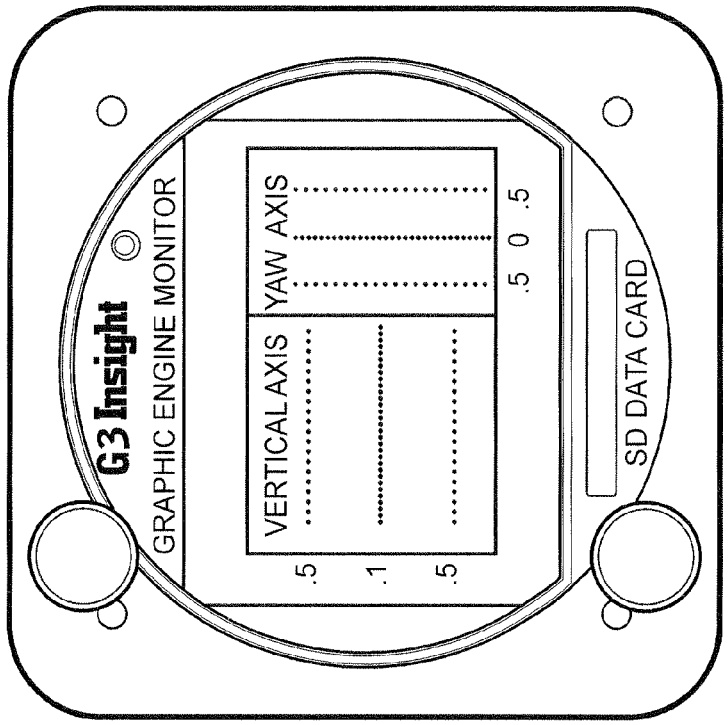
Figure 2D:
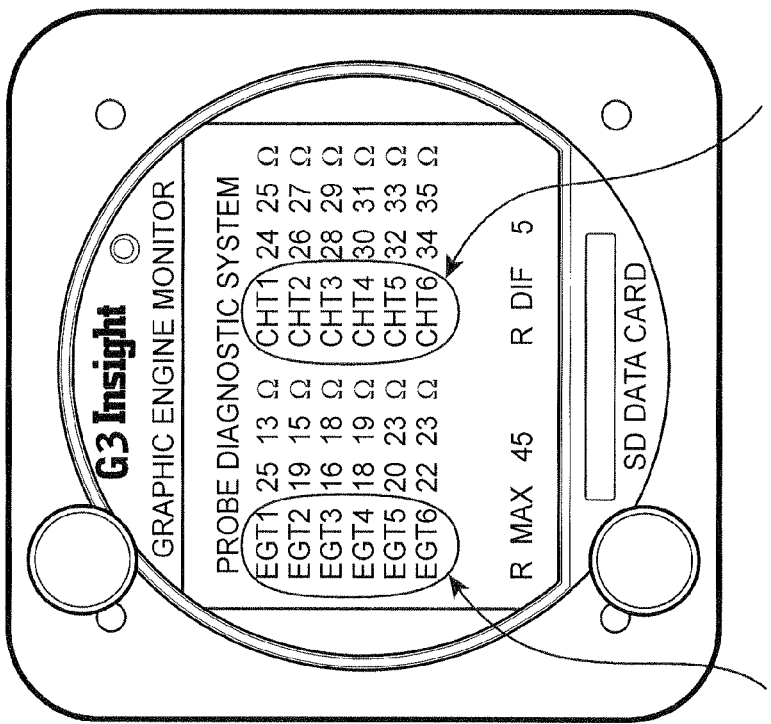
Figure 2G:
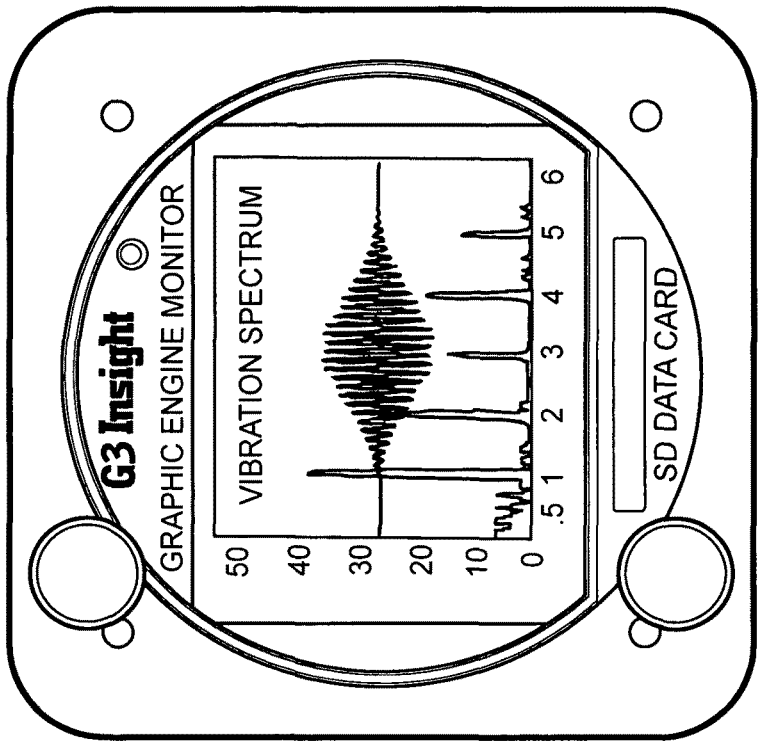
Figure 2F:
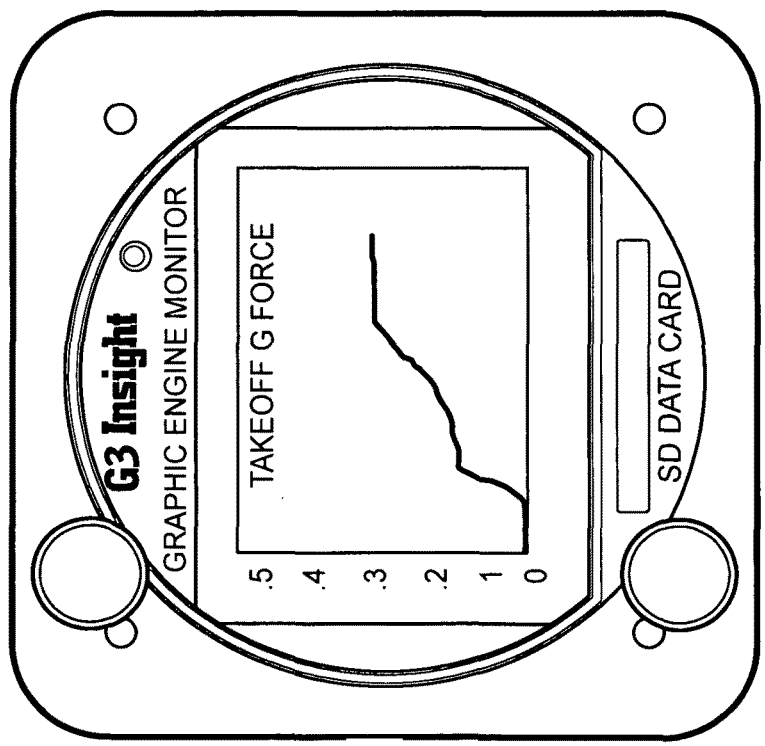
Figure 2H:
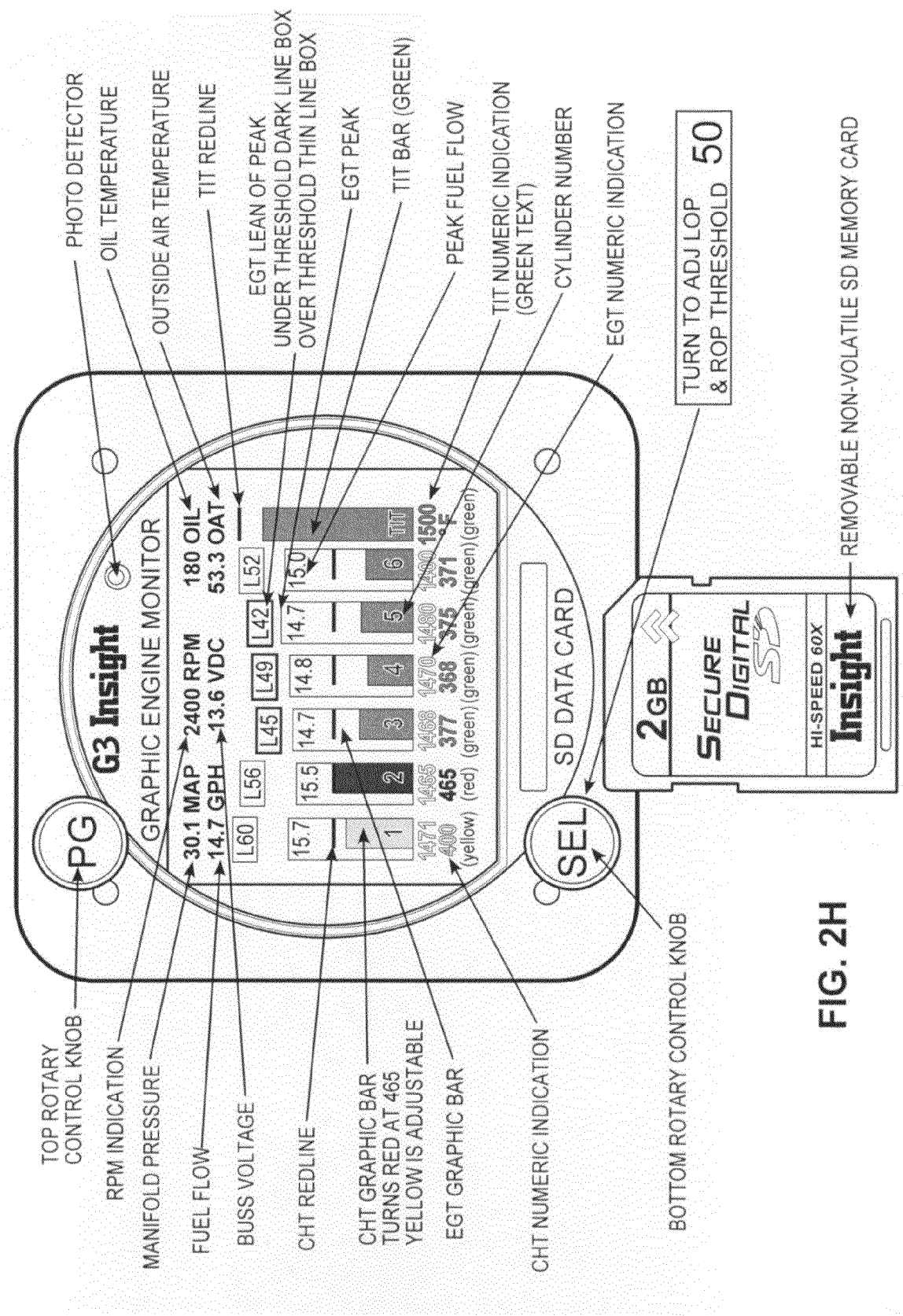
Figure 2I:
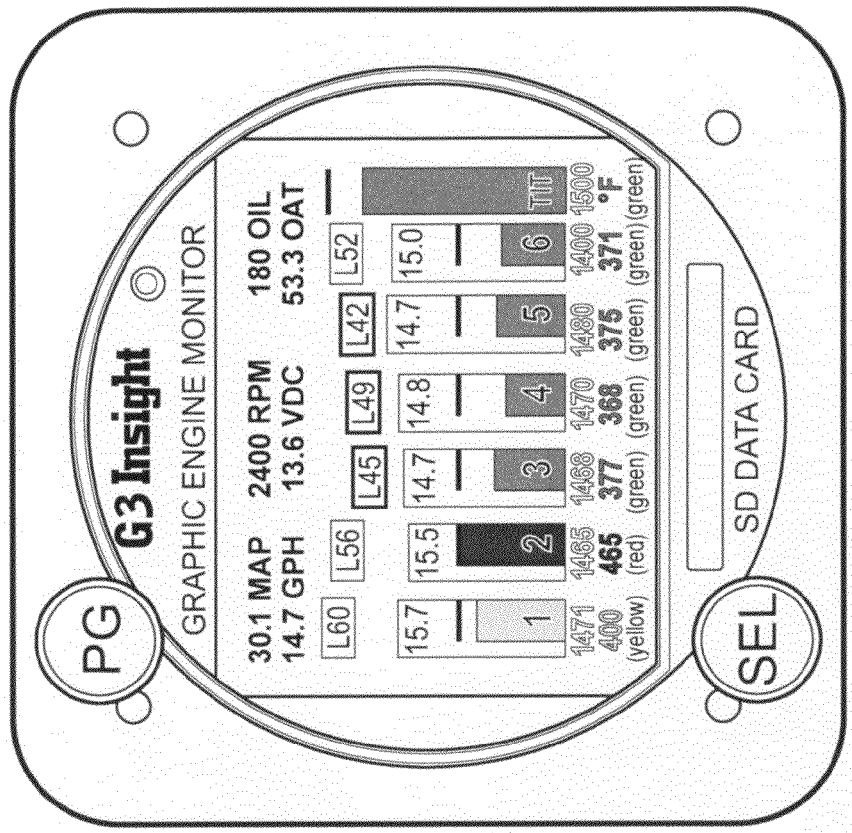
Figure 2J:
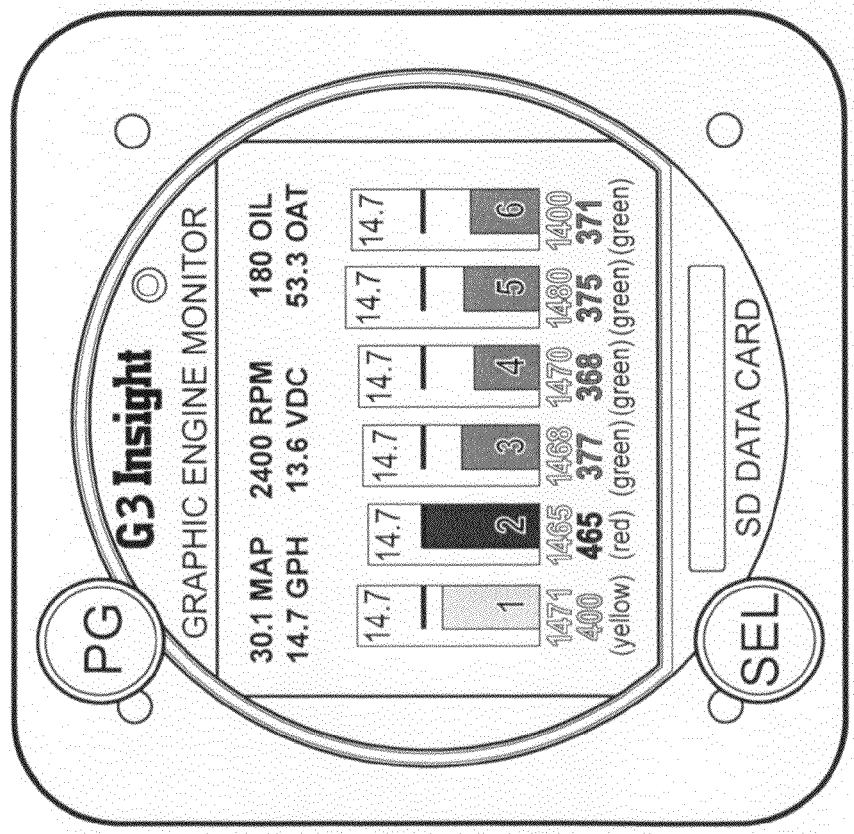

In FIG. 2I, the screen is shown after the screen has been "cleared" before a leaning process is started. That is, pushing the SEL switch causes any previously displayed boxes or other indications of leaned engine operation to disappear. Thereafter, during a leaning process, a captured current EGT variation value will reappear in a box above each EGT bar as that cylinder reaches it peak EGT. For example, as shown in FIG. 2J, the leaning process has proceeded LOP for all cylinders. However, cylinders 3, 4 and 5 have not yet reached the pilot's set threshold target value of 50° (e.g., see FIG. 2H).

Figure 2K:
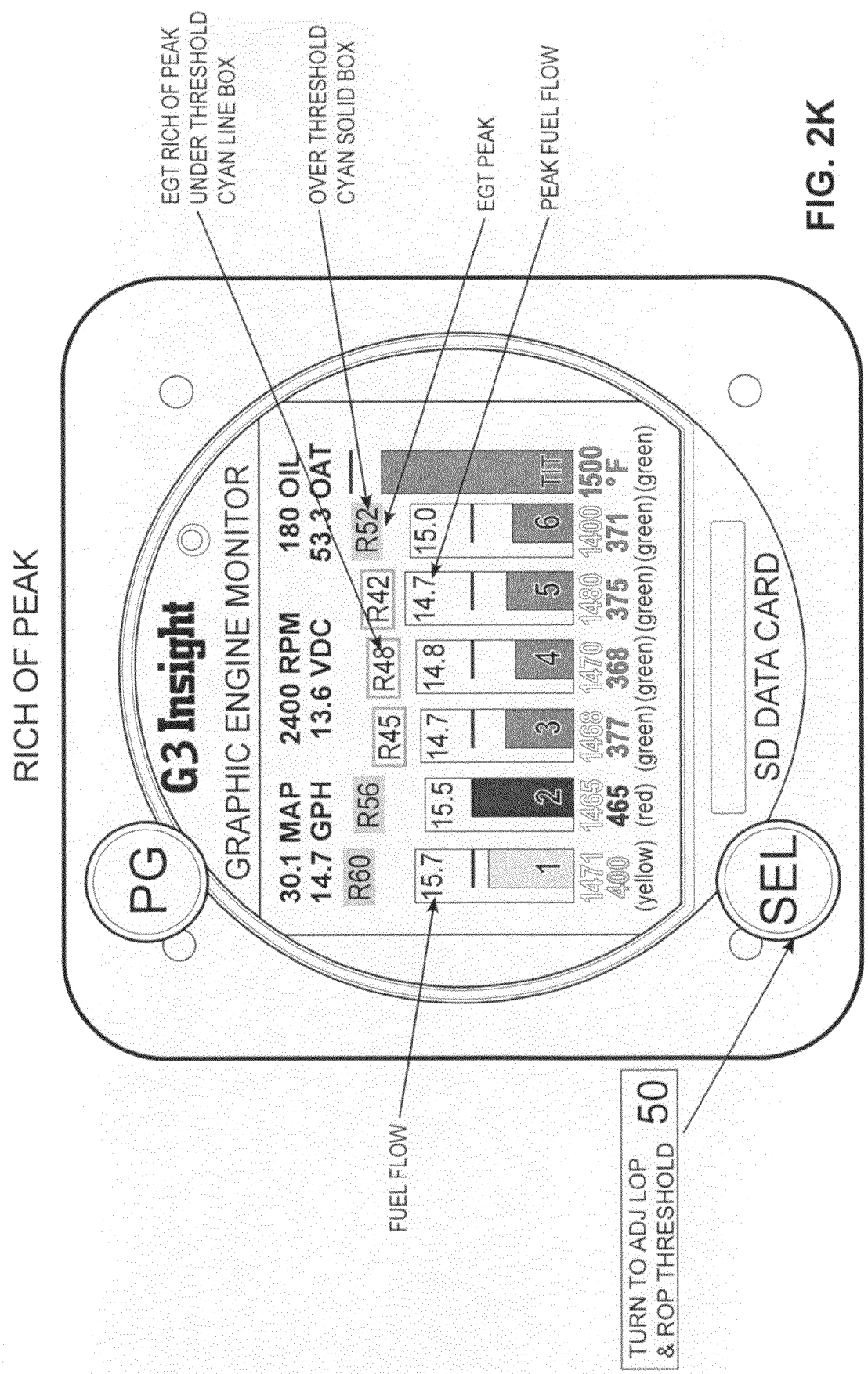

A similar operation occurs ROP as can be seen at FIG. 2K where a ROP leaning operation has not yet been concluded because cylinders 3, 4 and 5 are not yet at or above the user-set threshold target of 50° rich of peak EGT.

It will be noted in all these leaning screen displays, color-coding is preferably used to help indicate which cylinders have met the user-set threshold EGT variation from peak EGT. An alphabetic character R or L is also displayed with the displayed numeric variation in EGT from peak EGT in a box which is also vertically positioned in proportion to the EGT variation value being displayed. Thus, there is both an analog-type graphic display as well as a digital numeric display of EGT variation.

It will also be noted that the FF value at the time of peak EGT is captured and numerically displayed at the top of each EGT bar. The digital numeric EGT/CHT values are also displayed below each EGT/CHT analog-type bar for each cylinder.

Figure 2M:
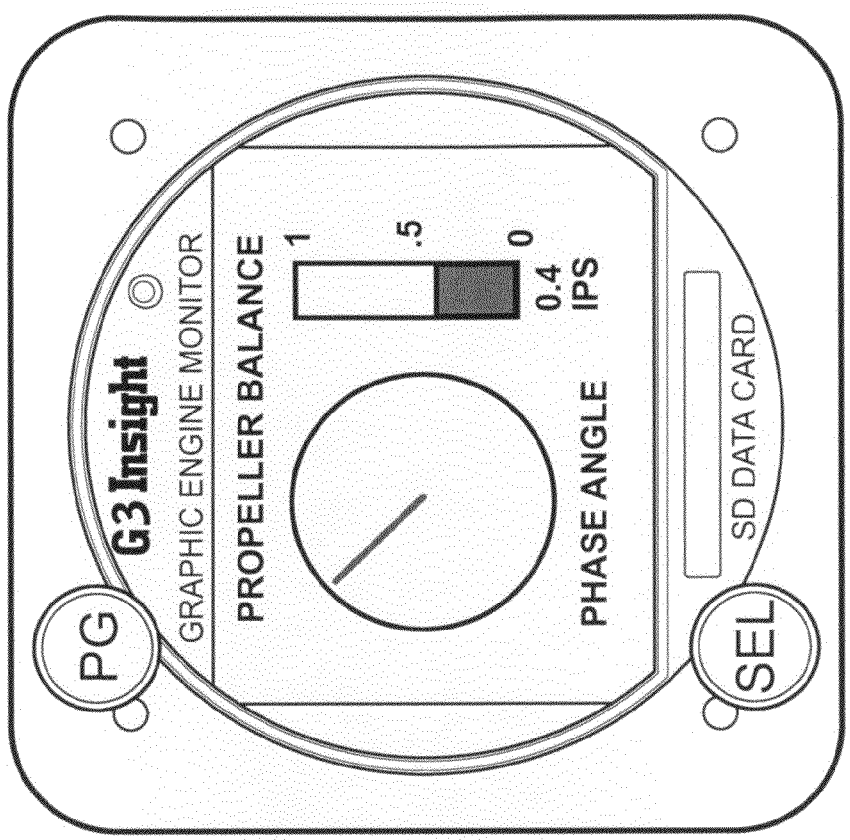
Figure 2L:
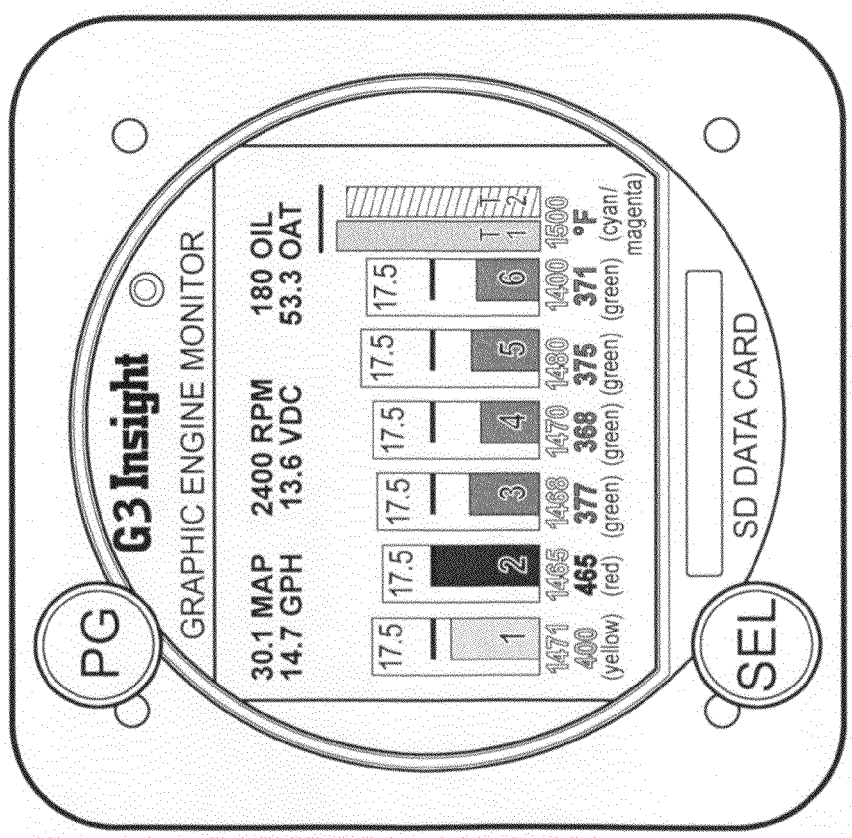

As shown in FIG. 2L, if there are two (or more) turbochargers, the turbine inlet temperature (TIT) for each is displayed in bar graph format. If space permits, at least one (e.g., a selected or sequenced choice) digital numeric value may also be displayed in visual association with the TIT bar(s). Different colors can be used for each turbocharger.

Diagnostic Screen (See FIG. 2D)

Thermocouple circuits are tested with an ohmmeter. Temperature probes show as an open circuit when worn out. The instrument can measure the resistance of both the positive and negative leads of the thermocouple lead wires and of the probe itself. The diagnostic screen shows the resistance of each lead for each EGT and CHT thermocouple probe circuit. The total resistance of each lead and the resistance difference are compared to preset limits. Any probe circuits exceeding the limit are annunciated in red characters. The two digit ohm values shown in FIG. 2D would more typically be in the 1-5 ohm range for actual engine installations.

Engine Vibration Screen (see FIGS. 2E, 2G)

Engine vibrations are reported by an engine-mounted accelerometer (e.g., an Analog Devices® three-axis accelerometer preferably collocated with the fuel transducer in the exemplary embodiment). The accelerometer output(s) is/are preferably measured locally by its own main processor unit (MPU) which sends 16 count-averaged data to the remote (e.g., cabin-mounted) instrument MPU via a digitally addressable SMB buss.

As those in the art will appreciate, use of an addressable buss means that multiple addressable accelerometers may be used at different remote locations and be individually addressed for data download requests as desired. For example, in a helicopter aircraft, one may wish to monitor vibration and/or dynamic balance of various rotors, rotor hubs, gear boxes and the like.

Data averaging of accelerometer output improves resolution and reduces noise level to better match the 72 db dynamic range of the preferred vibration analysis system. Digital transmission of remotely generated accelerometer data provides better noise immunity that is essentially impossible to achieve if accelerometer outputs were transmitted in analog form.

Fuel flow is also conveyed over the addressable SMB buss in two forms, filtered and unfiltered. A low-pass finite difference filter (that responds slowly to change) processes the filtered data, masking random fluctuations common to carbureted engines. The unfiltered form responds quickly and is preferred for fuel injected engines. In either case, pulses from a paddle-wheel style fuel transducer are converted to fuel flow by taking the inverse of the period of 16 pulses.

The typical display of Fast Fourier Transform (FFT) harmonic data displays frequency along the horizontal axis. This could be disadvantageous in the application if harmonics slide back and forth in position with changes in engine speed, thus confusing interpretation. Ideally, a harmonic frequency position on the graphic display should remain fixed, regardless of engine speed, to retain a familiar consistent picture. See FIG. 2G where the harmonic numbers are displayed in relatively fixed positions. To achieve this, the sample time/rate of the accelerometer is phase-locked to engine revolutions so the number of vibration samples per engine revolution is constant—as is their phase with respect to engine revolution. The FFT vibration harmonics thus remain stable in displayed position with changes in engine speed. The exemplary instrument measures engine speed with a spark plug inductive sensor and then sends a sample trigger/rate command to the accelerometer's local processor. The number of vibration samples taken per engine revolution is thus constant.

Three axes of vibration (in the exemplary embodiment) are processed by a Blackman-Harris window and FFT (e.g., using 512 point resolution) and are displayed (see FIG. 2E) in a log magnitude harmonic form in three different colors. The base noise level is about 72 db below full scale. Multiple axes facilitate identification of the vibration source. The user may pan and zoom the vibration display to focus on any area of the display. Engine vibration is a valuable tool for detection of mechanical faults and propeller balance measurement, but is also important for lean of peak (LOP) operation where achieving an acceptable level of engine roughness is a goal. When the question is how much vibration is normal, the instrument display provides insight to the answer.

Figure 2N:
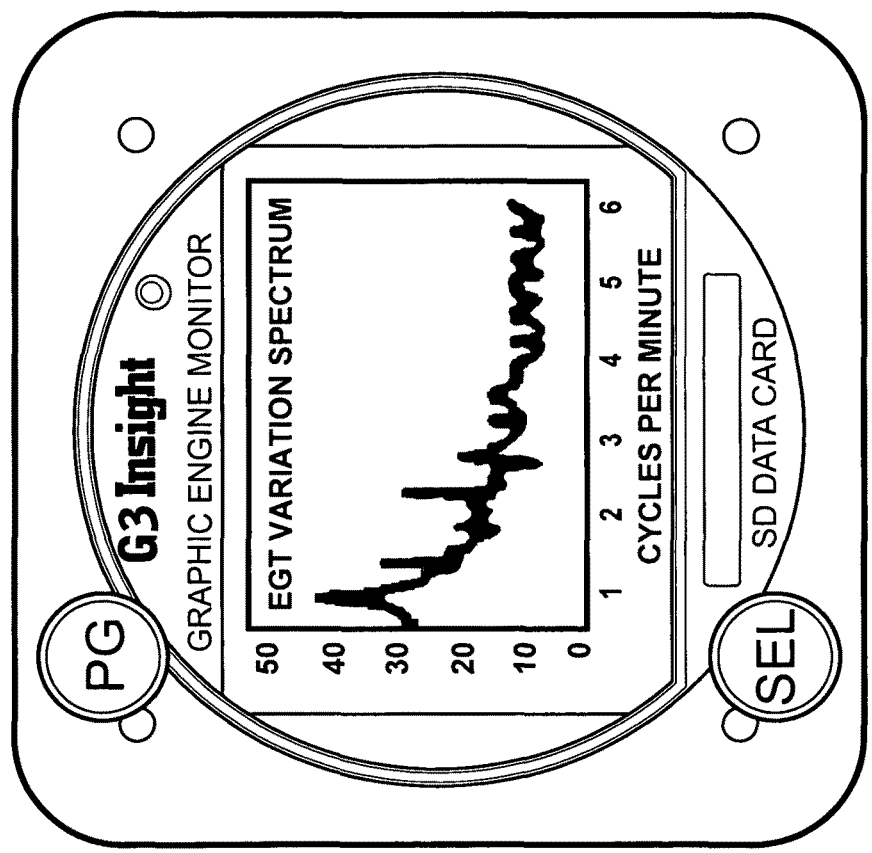
Figure 5A:
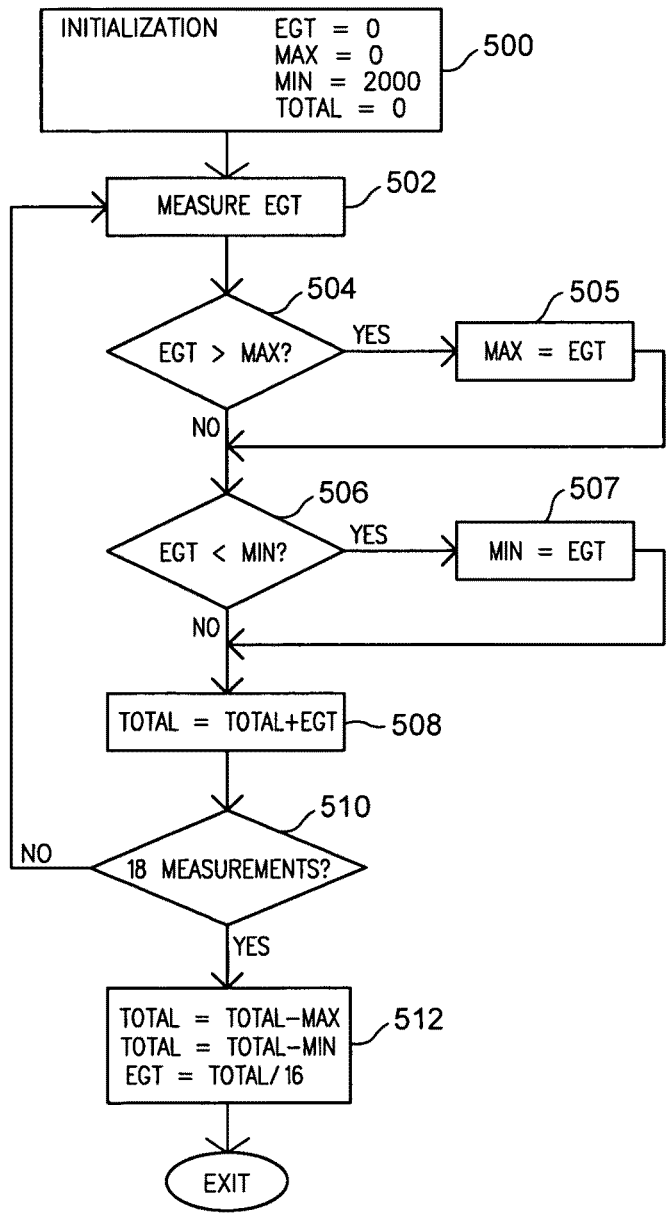
FIGS. 5A-5S are logic structure flowcharts depicting control logic structure for controlling the exemplary embodiment and various of its exemplary modes of operation.
Figure 5B:
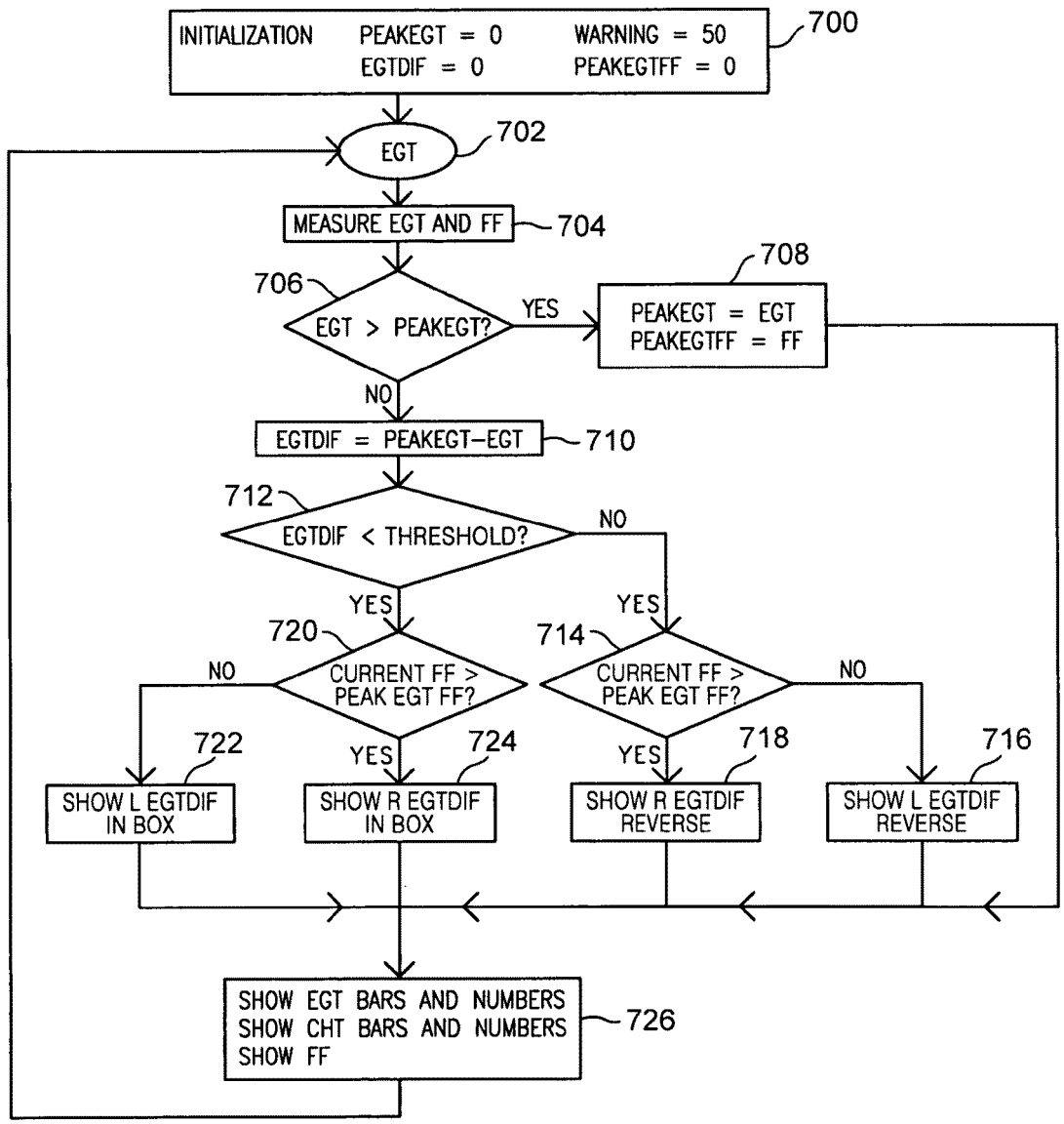
Figure 5C:
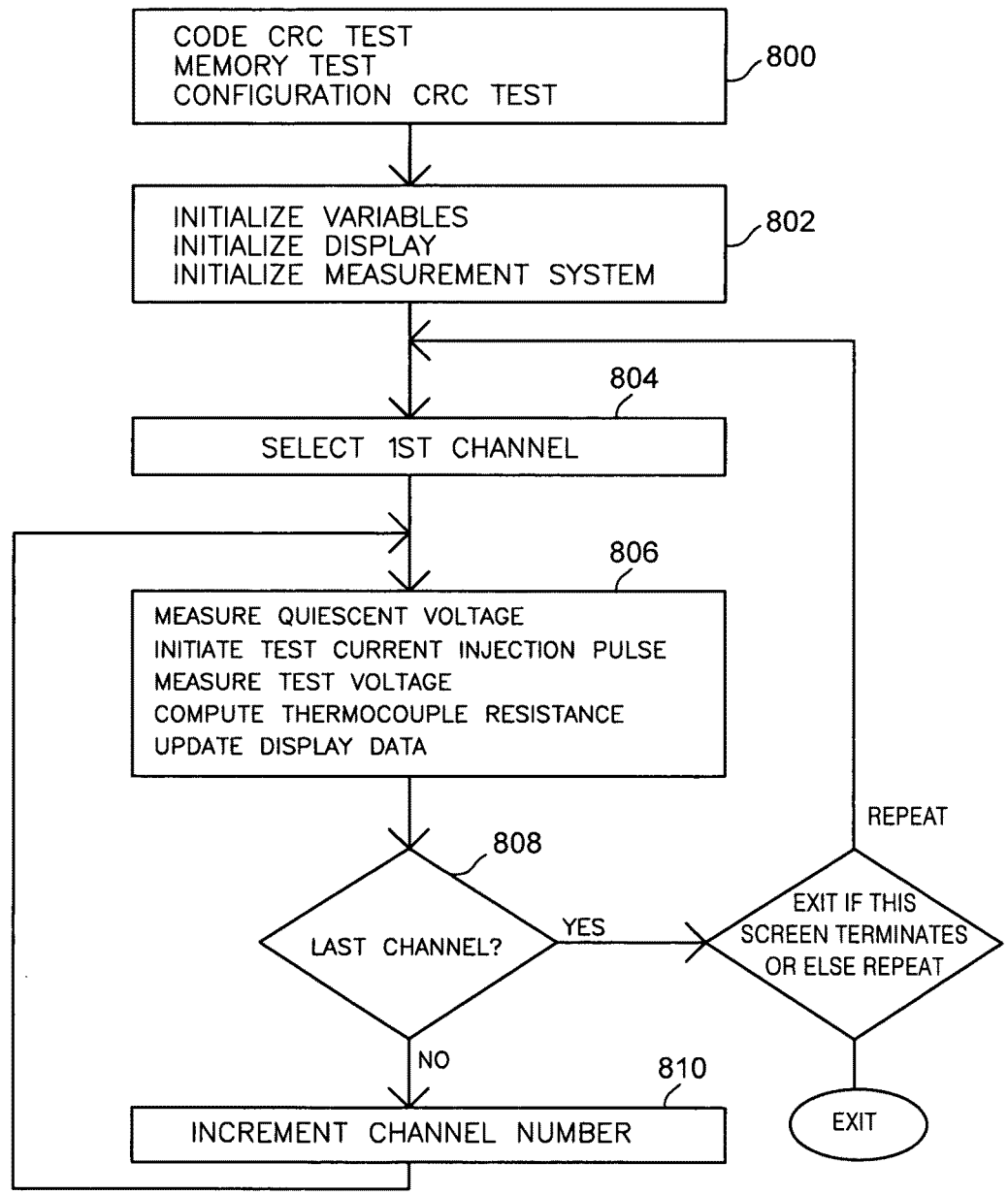
Figure 5D:
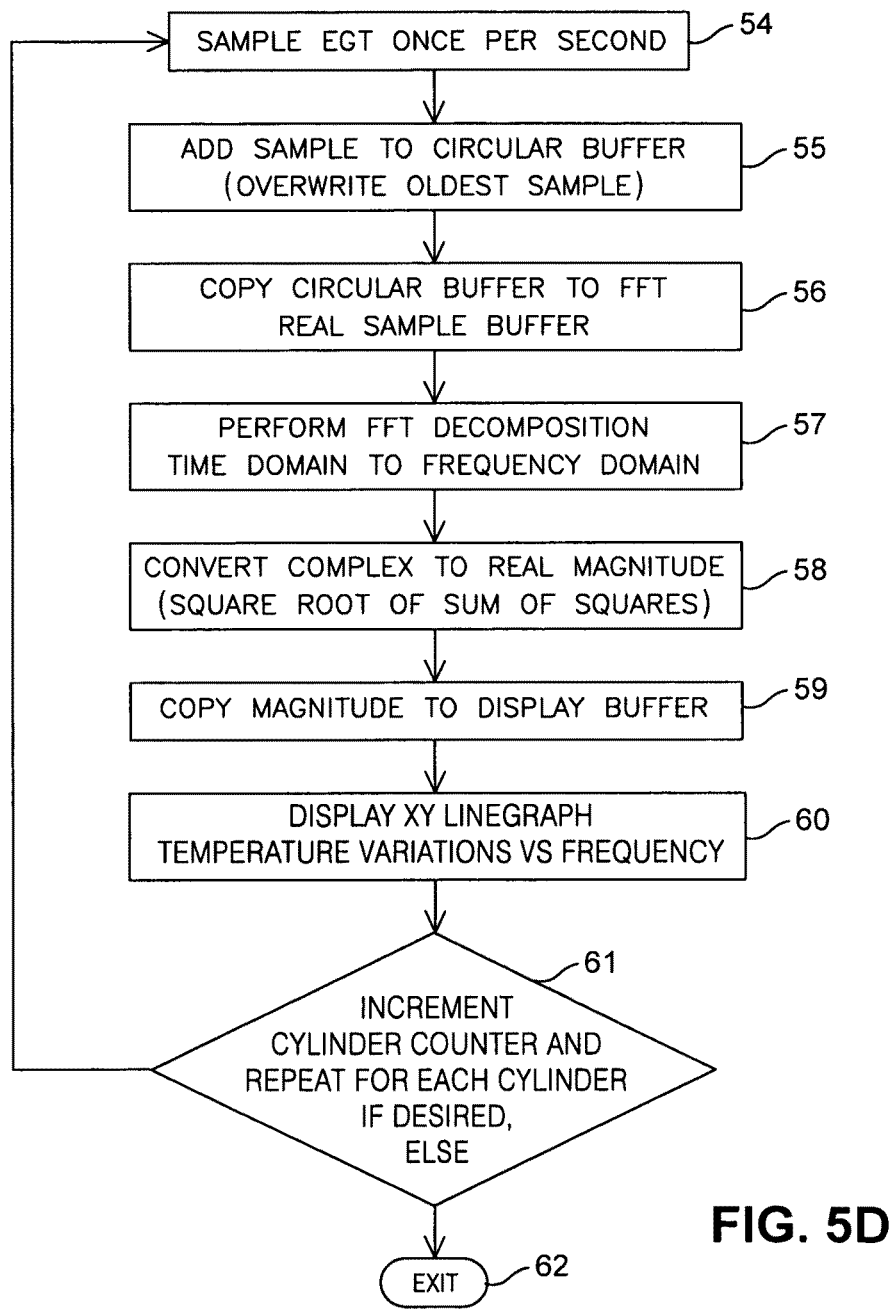
Figure 5E:
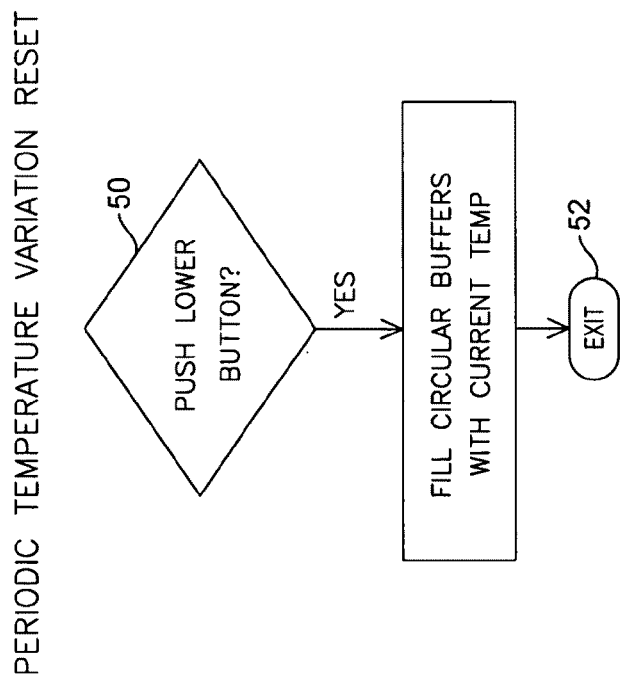

PTV Periodic Temperature Variation (see FIGS. 2N, 5D and 5E)

Some valve-related engine faults produce a slow periodic variation in EGT related to slow intended valve rotational position changes during engine operation. The EGT oscillation rate (e.g., corresponding to a valve defect located at one point on its periphery) is on the order of one cycle every minute or two. This is too slow to be readily identified by occasional observation of temperatures alone. Yet it is important to discover this phenomenon because it may lead to a catastrophic engine failure. The slow periodic variation readily appears in a slow-sampled frequency spectrum analysis. Temperature samples are collected once per second for each cylinder in separate ring buffers and a slowly moving "window" of thus accumulated samples is FFT analyzed each second. The entire ring buffer sample accumulation interval containing e.g. 512 samples is about 8 minutes long so low frequencies will be apparent while the once-per-second analysis/display rate will give the very slow process a dynamic feel. A normal indication will be a flat line with a little noise, while a trouble indication will show as an obvious spectral peak (e.g., see FIG. 2N).

As shown in the MPU program flow chart of FIG. 5E, at step 50 the state of the lower push button switch is periodically monitored. If pushed, then at step 52 a circular buffer memory (for each or a selected cylinder) is filled with currently captured EGT data to reset the periodic temperature variation analysis process depicted in the MPU program flow chart of FIG. 5D.

The program code structure of FIG. 5D is entered at step 54 on a timed interrupt basis (e.g., once per second). At step 55, the newly acquired sample (e.g., one per cylinder) is respectively added to the appropriate cylinder-associated circular buffer (if more than one cylinder is to be monitored) to overwrite the oldest sample. Then at step 56, a cylinder's circular buffer is copied to a Fast Fourier Transform (FFT) sample buffer and, at step 57, a FFT is performed to transform the time domain circular buffer data to the frequency domain. At step 58, the complex-valued output of the FFT is converted to corresponding real-valued magnitude values (e.g., the square root of the sum of the squares of real and imaginary values) as a function of frequency and copied to a display buffer at step 59. At step 60, the display screen is driven to output an x-y line graph of temperature variations as a function of frequency. If the steps 54-60 have been performed for only one particular cylinder, then a cylinder test counter is incremented at step 61 and control passed back to step 54 for analysis of the next cylinder (e.g., until each cylinder has been analyzed), else exit is taken at step 62. As will be appreciated, all cylinders can be analyzed with one pass through program code similar to that of FIG. 5D—and the analysis for each cylinder can be displayed separately or collectively (e.g., on separate lines).

Turbulence Display (see FIG. 2F)

The exemplary instrument contains a local accelerometer effectively affixed to the airframe of the aircraft (e.g., an internal three-axis accelerometer) sampled at modest rates to measure turbulence and landing shock. Knowledge of airframe G forces will help the pilot to operate the airplane safely (e.g., by slowing during turbulence to maneuvering speed). Landing shock is a good training aid for smooth landings and a predictor of structural damage. Logged G force data will effectively inform a report of unauthorized acrobatic activity or abuse of rental aircraft. It could also be useful in accident investigation.

Vibration/Balance Measurements (see FIG. 2M)

Propeller balance has a significant effect on engine smoothness. Just the slightest propeller imbalance also has a profound effect on passenger comfort.

Typically, propellers are balanced on the ground using helicopter balance equipment. However, the exemplary embodiment instrument uses an engine-mounted vibration accelerometer and a once-per-revolution (or once-per-two-revolution) spark ignition signal to synchronize accelerometer data collection with engine crankshaft (and thus propeller) rotational position, thus deriving meaningful propeller balance data.

Because the accelerometer sample interval is phase-locked to propeller rotation, FFT magnitude and phase of the fundamental harmonic (e.g., corresponding to the frequency of propeller rotation) are good measures of propeller balance. Not all of the fundamental harmonic vibration is attributable to the propeller, but adjusting balance to minimize it, no matter what the cause, achieves the most comfortable result. The harmonic magnitude is a measure of the correction weight required and the harmonic phase (with respect to propeller rotation) indicates the clock angle (e.g., arctan of the ratio of imaginary and real components of the complex-valued FFT output) location for adding a correction weight. The measured phase angle for propeller balance can be derived to represent an angle in the direction of propeller rotation away from the top dead center (TDC) engine position (e.g., TDC differs from detected spark ignition time by a known time delay). The balance display (see FIG. 2M) shows phase as a polar vector like the hand of a clock and magnitude as a linear bar graph with a numeric reading. Once a calibration value has been determined, a second bar graph with numerical presentation can display the mass of the required correction weight directly.

A change in propeller balance may indicate a propeller fault, blade damage, spinner damage, ice in the spinner, blade ice accumulation or ice shedding.

File System Screen

A file system screen (not shown) is preferably used for displaying and handling MicroSoft Windows® format files on the SD card. Files are created directly in CSV format (comma separated values) for direct importation in Excel®. Graphs may also be presented directly in .pdf format as well. The user may scroll the screen to highlight a given file or subdirectory with the lower knob. Pushing the button will open the highlighted subdirectory or the highlighted file. The top entry in each screen returns one upwards one directory level.

Configuration Screens

There are also preferably three configuration screens (not shown): (a) user anytime, (b) user engine not running, and (c)

dealer. The "dealer" screen is accessible only at power up, therefore not in flight. It is used to configure the instrument for the airplane during installation, like the number of cylinders, turbochargers, engine type, etc. In general, things that are unlikely to ever change. The "user engine not running" screen is for things that should not be modified in flight. The "user anytime" screen is accessible in flight by the pilot to change things relevant to in-flight use.

Controlling the Instrument

The exemplary instrument has two control knobs that operate combination rotary and push-button switches. The top knob in general controls screen selection, while the bottom knob controls items within the given screen. Each screen assigns its own functional needs to the controls that may change depending on context. A screen may also label the controls with guidance information like "push to exit."

As those in the art will appreciate, there are many types of user-controllable inputs that may be used instead of, or in addition to, the exemplary control knobs. For example, an audio input from the pilot's microphone may be used in conjunction with conventional voice-recognition functionality to control instrument operation. Eye movements can also be user-controllable inputs.

Figure 3:
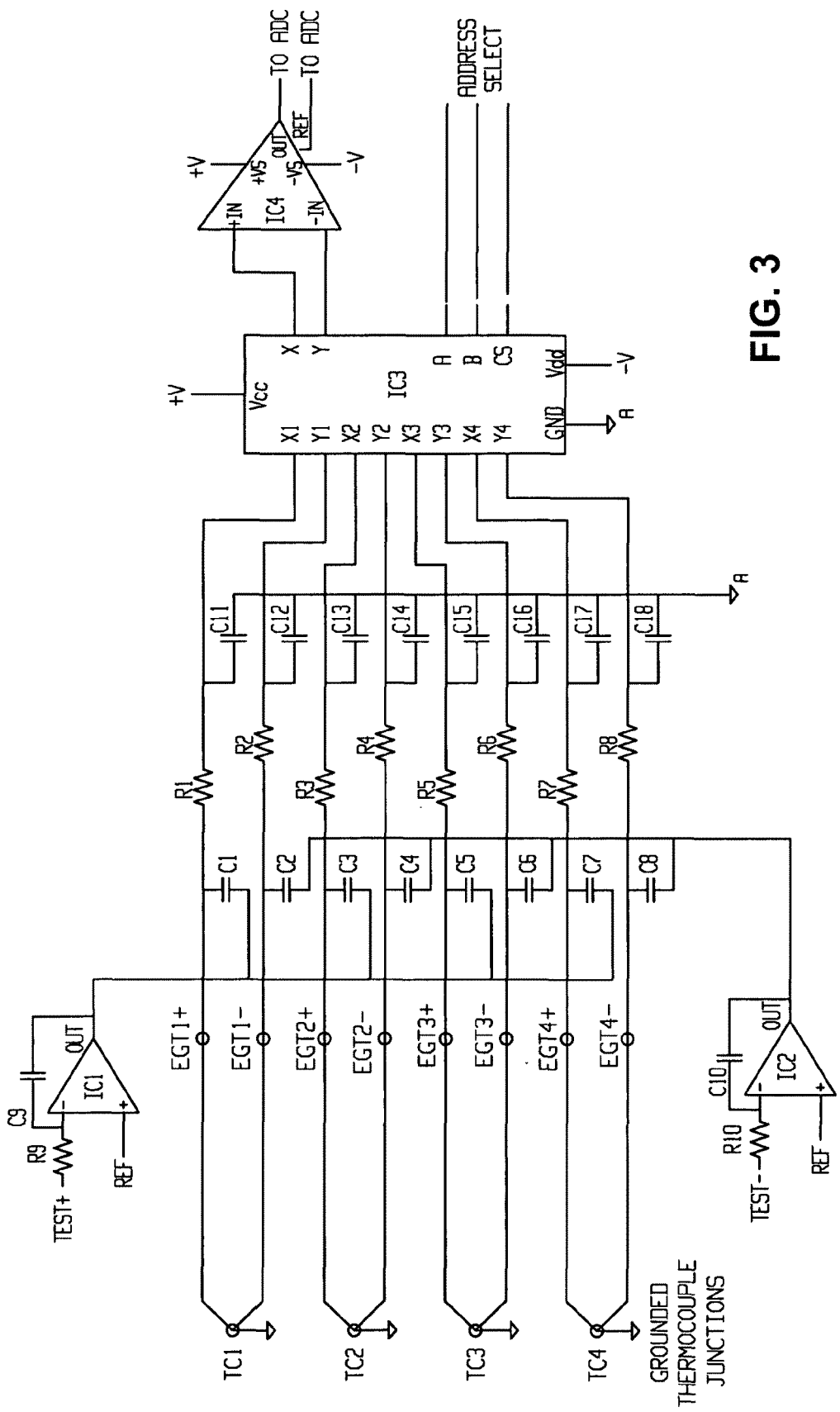
FIG. 3 is a detailed circuit diagram for the thermocouple diagnostic measurement system capable of measuring lead resistance as well as thermocouple resistance for each cylinder.

Thermocouple Testing Methodology (see FIGS. 3, 5C)

Testing the integrity of a multi-thermocouple measurement system, while highly desirable, is rarely done because it was thought to require a cumbersome configuration. Typically, a duplication of all the input multiplexers is required to selectively impose a constant current across each thermocouple to measure its resistance. A new, more practical, way is described below (in conjunction with FIG. 3) that will measure the resistance of the thermocouple and its lead wires, while the thermocouples also remain functioning normally in circuit to measure EGT/CHT temperatures.

A typical system consists of a number of thermocouples connected to dual input multiplexers leading to a single-channel measurement system. The measurements are usually made differentially with a high common mode rejection op amp to reject noise and common mode voltages. This needs to be done carefully (as will be appreciated by those skilled in the art) to achieve good results with the typically small thermocouple (TC) voltages.

The presently preferred exemplary approach uses a novel way to impose a constant current with little circuitry (as shown in FIG. 3). In fact, only two capacitors per TC are required. Using a capacitor to couple a DC constant current to a TC lead wire is perhaps unconventional, but has several distinct advantages. Because in some applications the TC may be electrically grounded to a substantial DC voltage that adds to the TC temperature dependent voltage, resulting in a potential well above or below ground potential. The idle charge on the capacitor follows this potential and thus automatically cancels its effect. To impose a constant current through a capacitor, it may be driven it with a linear ramp whose direction determines the polarity and whose slew rate determines the constant current magnitude. The duration of the current flow is limited to the duration of the linear ramp. However, because the measurement can be accomplished in mere microseconds, ramp duration is not a problem that needs to materially interrupt on-going CHT/EGT measurements. The constant current is injected directly into a lead wire preceding the multiplexer so only the lead and TC resistance are measured. The current exits the probe junction to ground completing the circuit.

This allows for the measurement of each lead wire separately. Inadvertent shorting of the lead wire somewhere along its length to ground may be measured and identified. Another key feature evolves from the ability to measure each lead separately. In some applications, some type of thermocouples may be mixed. The resistance of J-type and of K-type lead wires differs significantly, which could become a distinguishing characteristic only if the wire length is known. More importantly, the ratio of resistance of the lead wires within a J-type cable differs by about 10:1 compared to the ratio of the K-type cable. This ratio is cable length independent and a reliable indicator. A universal system based on this insight may handle mixed J-type and K-type thermocouples without significant problems.

Another key advantage is the ability to measure the TC probe systems in circuit while they continue measuring temperature. Two or three measurements are required for this procedure. One is the undisturbed temperature-dependent voltage. If this voltage is above one-half full scale, then the preferred approach is to induce a negative constant current for resistance measurement. The resistance related voltage is extracted by subtraction of this reading from the temperature-dependent voltage. If the temperature-dependent voltage is below one-half full scale, then a positive current is induced for resistance measurement and a subtraction of the temperature-related voltage produces the resistance-related voltage value.

Ohm's law $R=V/I$ determines the resistance. Because it is convenient to ramp the integrator both ways, measurements of both polarities are typically done. The preferential value may be selected by picking the largest one, although they will be the same if neither reading hits saturation of the A/D converter. Using the same measurement system to read temperatures and resistances is convenient and efficient. Because a thermocouple generates little voltage, the measurement system has high gain and sensitivity, successful resistance measurements require test currents of only 100 uA or so. In the exemplary implementation, measurement resolution is about $1/100$ of an ohm, but perhaps only 0.1 or 1 ohm resolution need be displayed.

Component Level Description of Resistance Measuring Circuitry (see FIG. 3)

In FIG. 3, four channels of thermocouple measurement are shown. As those in the art will appreciate, it could be expanded to any number of channels. IC3 is a multiplexer used to sequentially connect temperature probes to the measurement amplifier IC4. IC1 is configured as an integrator that generates a linear ramp controlled by an output port of the main data processor chip. To measure the resistance of a positive lead, integrator IC1 is used to inject the test current. The reference input is set halfway between the MPU (main processor unit) logic 0 and logic 1 voltage. The test+input is driven with a logic 0 or logic 1 from the MPU. The current flow into the integrator is relative to the reference input so the logic signal acts as a bipolar signal. A logic high signal drives the integrator toward the negative rail and a logic low signal drives the integrator toward the positive rail. A positive going ramp injects a positive current into the probe circuit. C1,3,5,7 differentiate the integrator ramp transforming it into a constant current flow into the positive lead. The current flows down the lead wire and out of the probe junction to ground.

This configuration injects a constant current into all probes simultaneously even though only one at a time is used. The unused current injection is ignored because only one probe at a time is connected to the input amp. When current injection is not desired, the integrator is left in positive or negative saturation where it will not move. Integrator IC2 in conjunction with C2,4,6,8 injects current to measure the resistance of the negative leads. If the integrator feedback capacitor (C9) and the current coupling capacitors (C1,3,5,7) are of the same capacitance value, then the current generated is the same as that flowing into the integrator via R9. The current in R9 is simply the (test voltage—ref voltage)/R9. Otherwise, it scales linearly with changes in component values.

Engine RPM Sensing (see FIGS. 4, 6A, 6B, 6C, 6E, 6F, 6G, 6H)

Engine RPM is measured for display to the pilot and to synchronize vibration sampling—and for fuel and horsepower calculations as well as vibration and propeller balance.

One requirement for propeller balance is to know the timing of the vibration relative to a fixed known rotational location of the engine (i.e., propeller). Engine RPM is required to display and log engine speed, necessary for fuel and horsepower calculations and necessary for vibration and propeller balance. Engine timing is often referenced to cylinder 1 being at some known angle away from "top dead center" (TDC). Thus, a once-per-revolution (or once-per-two-revolutions depending upon engine design) signal is needed. The often-used convenient tap for RPM is the magneto P-lead. However, this has a pulse signal for each spark plug firing so it does not distinguish rotational position without ambiguity. Each spark plug signal is the same as the next.

Automotive timing lights use a clamp-on inductive sensor on the spark plug lead or a trigger signal. This works well on unshielded automotive leads. Aircraft spark plug wires are shielded like coaxial cables so the prior type of inductive sensor clamped around the entire cable may work—but will likely work poorly and is thus not the presently preferred sensor. The shield of each wire shares a ground loop with all the other wires because they are connected to the engine block at one end. The typical prior inductive pickup thus would see a signal from all the plugs even though it is directly coupled to only one spark plug wire.

Figure 6A:
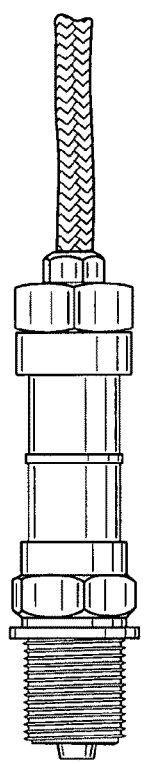

The configuration of an aircraft ignition system makes signal sensing difficult. All the plug wires are shielded and terminate at the plug with a screw-on cap. A typical unaltered shielded spark plug connected to its shielded ignition cable is shown in FIG. 6A. The purpose is, of course, to minimize ignition noise for radio performance and prevent random arcing in moist conditions or at high altitudes where air density is reduced. The need for a timing index mark (once-per-revolution or once-per-two-revolutions) requires sensing one and only one spark plug firing (or some other unambiguous engine rotational position sensor). One key to picking up a signal without interference is to isolate the center conductor of the shielded spark plug cable. While current in the shield is contaminated by firing of other plugs, the current in the center conductor is cleaner in this respect. Access to this center conductor wire is not easy in the field. However, the exemplary embodiment harmlessly taps into this signal while retaining the integrity of the shielded spark plug wiring system.

Figure 6B:
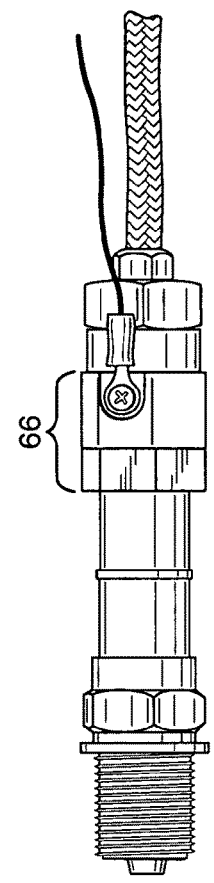
Figure 6C:
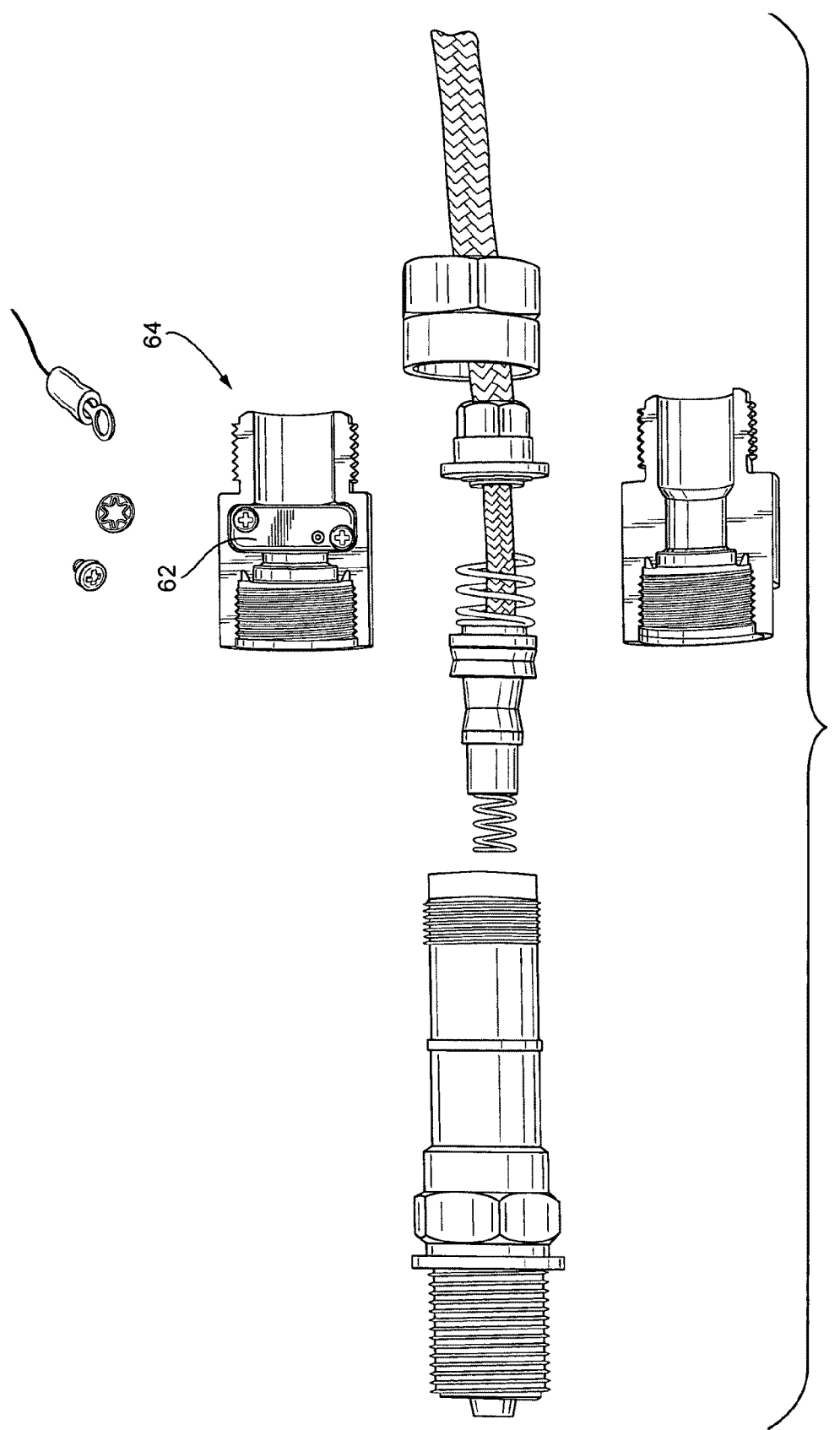
Figure 6E:
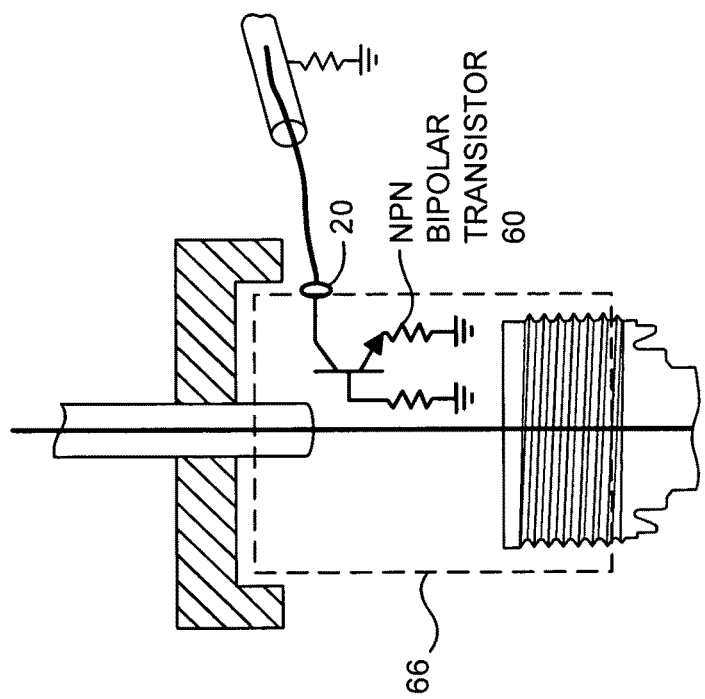
Figure 6D:
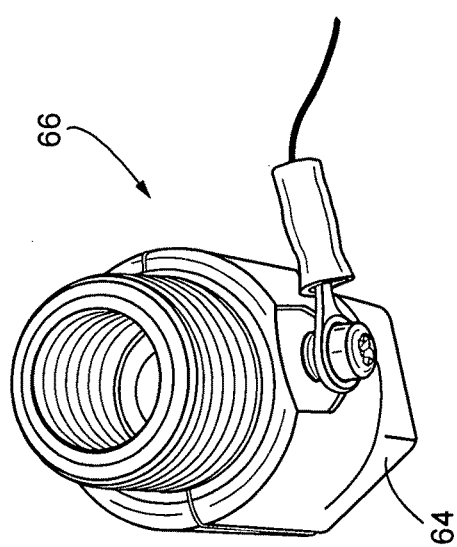
Figure 6J:
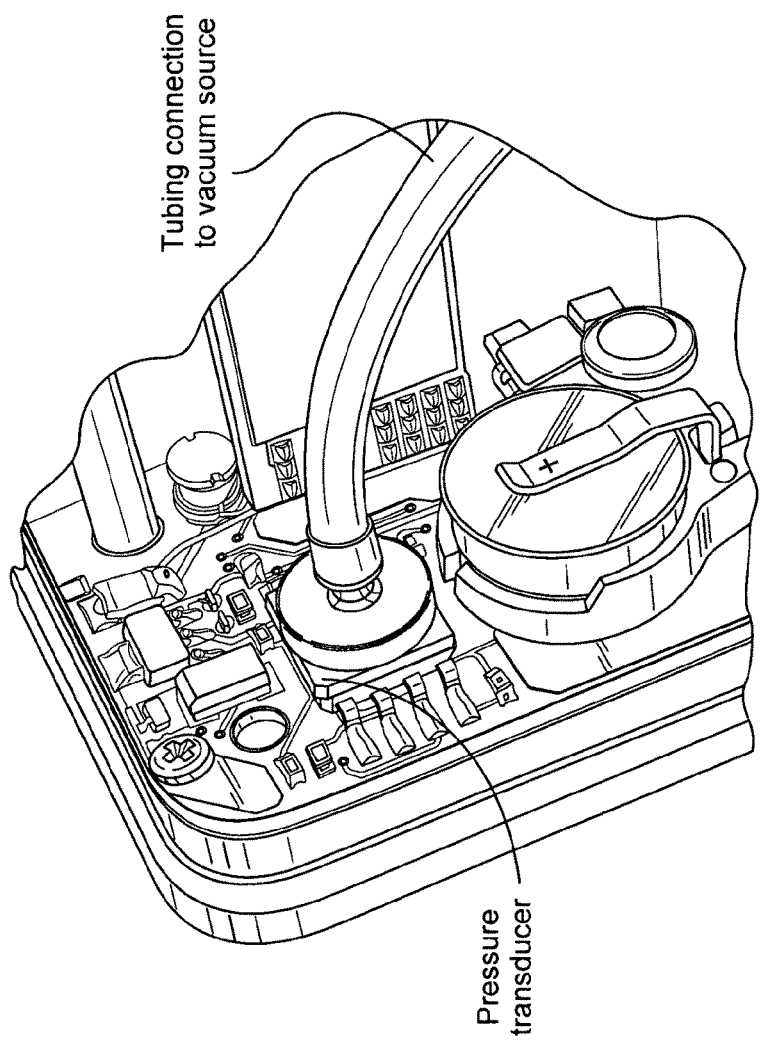
Figure 6I:
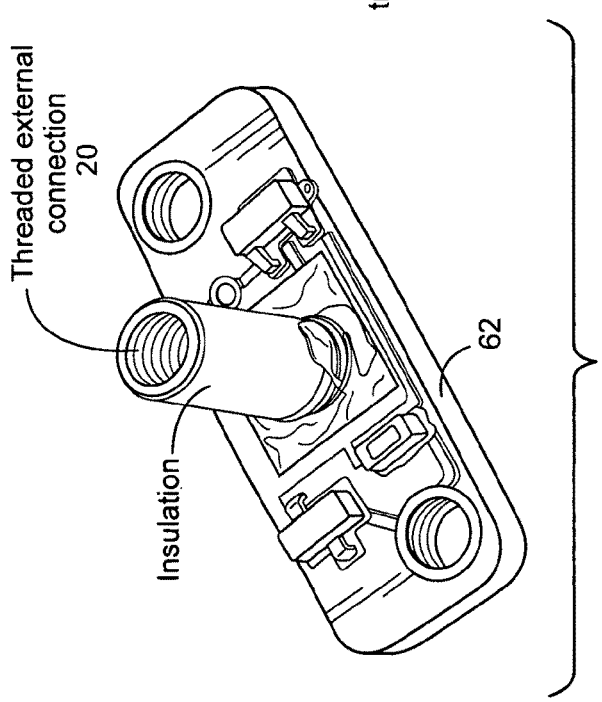

A specialized, longitudinally-split bushing 66 (e.g., of 6061T6 aluminum), with internal threads on a distal end and external threads on a proximal end, is inserted between the cap and the plug (which have mating external/internal threaded connections). A spark plug including this exemplary shielded adapter 66 is shown in FIG. 6B. An exploded view of the separated pieces is shown in FIG. 6C. The adapter 66 itself is shown in assembled form in FIG. 6D and in schematic form in FIG. 6E. This is highly desirable because all airplane piston engines (except diesels) have spark plugs. The special bushing 66 makes a strong, unobtrusive connection. It contains either a voltage or (preferably) a current sensor to pickup the spark plug ignition signal. The current sensor in the exemplary embodiment uses a split ferrite (or other magnetically permeable material) toroid core 70a, 70b with a few turns of wire 71 wound about the core. The voltage sensor may be a bipolar or FET transistor 60 with a simple capacitive pickup. Both the current and voltage pickup signals are strong.

In the electrostatically-coupled (voltage) sensor system (e.g., see schematic depiction at FIG. 6E), the dv/dt (rate of change of voltage) is very high, rising quickly to tens of thousands of volts and then rapidly dropping when the plug fires. The signal is strong enough to turn on an NPN bipolar transistor 60 (affixed to the reverse side of circuit board 62 in split half 64 of the adapter 66) via stray capacitive coupling to its base electrode even with no extra "antenna" connection to the base. A base-emitter resistor provides a little capacitive pickup area and can be used to control the gain and provide DC restoration. While the emitter is connected directly to engine ground through the housing, the collector connects to a single conductor (unshielded or shielded) wire to the instrument where it is upped to a 5-10 volt supply with a resistor of a few K ohms. The transistor 60 is normally in cutoff mode so the collector potential idles at the supply voltage and is pulled to ground when a plug fires. The transistor 60 will turn on only with one polarity and the plug may fire initially with either polarity. The plug circuit has stray reactive elements which cause the voltage to oscillate and this produces both polarities regardless of the starting polarity. So at least one pulse will always be produced. Sometimes, two closely spaced pulses are created by the oscillation. This can be acceptable for this application. Because the engine ground may have a common mode potential and alternator noise on it, the trigger threshold is set several volts above ground to ignore this situation.

In the preferred exemplary sensor design (FIGS. 6F, 6G, 6H), spark ignition current is tapped into with a split toroid core (70a, 70b) disposed about the spark plug center conductor wire in use within the shield adapter housing (72a, 72b). The spark current is on the order of a few amps so ample signal is available even with only two turns of wire 71 as a pickup winding on the core. Indeed, a ferrite core may not even be needed. When the winding is terminated with a high impedance, the core rings with stray capacitance to produce a damped sinusoidal oscillation for each plug firing. When terminated with a low impedance, the core and winding work as a current transformer producing a better pulse representation. Either signal can generate the required timing pulse.

Figure 4:
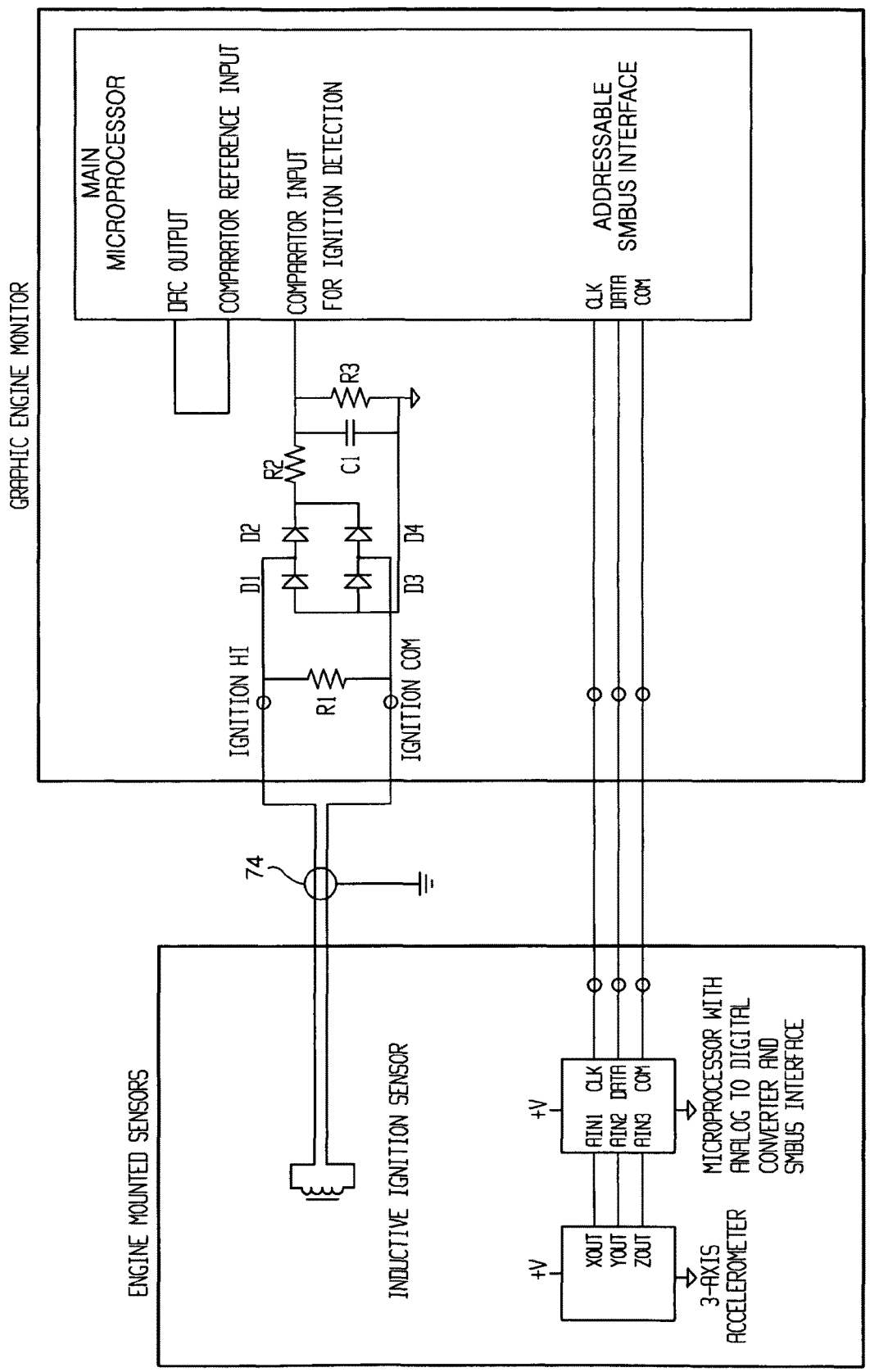
FIG. 4 is a more detailed circuit diagram for the engine RPM sensing circuitry of the exemplary embodiment.

The oscillating RPM trigger sensor signal is preferably rectified (e.g., see FIG. 4) using a diode (or diodes if a bridge rectifier is used as shown in FIG. 4) having a very fast recovery time (e.g., 100 ps). Perhaps only 4-5 cycles of a 20 MHz ringing RPM trigger signal may be available to capture—and produce a trigger pulse of perhaps only a few (e.g., 10) nanoseconds duration (to interrupt an MPU program code structure and initiate capture of accelerometer data).

As shown in FIG. 6G, the "balanced" (with respect to ground) induced signal is carried away from adapter 64 toroid core 70a, 70b via a shielded twisted conductor pair lead 74.

As shown in FIG. 4, when the balanced RPM sensor signal carried by twisted pair 74 is then demodulated (i.e., rectified) by D1-D4 (fast 100 ps recovery time diodes) and smoothed by R2, C1, R3, it is presented to interrupt the microprocessor.

Exemplary Program Code Structures (see FIGS. 5A-5S)

FIG. 5A depicts a logic structure for an EGT smoothing function useful for processing samples of the EGT parameter.

Preferably incoming EGT data is smoothed before display such as by the program code structure sown in FIG. 5A. Here, after initialization at 500, an EGT measurement is taken at 502 and tested at 504, 506 to discover recent maximum and minimum values which are captured at 505, 507, respectively. Then a running totalized EGT value is derived at 508—and the steps 502-508 are then repeated until 18 EGT measurements have been accumulated as determined at 510. Then at 512, the maximum and minimum of the 18 values are subtracted from the total. Dividing the remainder by 16 thus provides a smoothed EGT value before the routine is exited. As will be appreciated, this process is performed for each cylinder (perhaps in one iteration of a composite routine) periodically so as to provide current EGT data to drive the display.

FIG. 5B depicts a logic structure for an enhanced display during fuel leaning operations.

As exemplary program code structure for leaning mode operation is depicted at FIG. 5B. Here, after initialization at 700, current EGT and FF measurements are obtained at 702, 704. A test for peak EGT is made at 706—and a corresponding EGT and FF value are captured at 708 if it appears that the just received EGT might be the peak EGT.

At 710, the EGT variation (i.e., difference between what is thought to be peak EGT and the just received value of EGT) is captured. The EGT variation is tested at 712 to see if it has yet passed the user-set threshold value (e.g., 50° rich or lean of peak). If yes, then a test is made at 714 to determine if the current FF is greater than the FF at peak EGT. If not, then at 716, the EGT variation is selected for display in reverse contrast as the current EGT variation on the lean side of peak EGT. If yes, then at 718, the EGT variation is selected for display in reverse contrast as the current EGT variation on the rich side of peak EGT.

If the EGT variation has not yet passed the user-set threshold, then a branch is taken to 720 where a test is again made to see if the current FF is greater than the FF at peak EGT. If not, then at 722, the EGT variation is selected for display in a box as the current EGT variation on the lean side of peak EGT. If yes, then at 724, the EGT variation is selected for display in a box as the current EGT variation on the rich side of peak EGT. At 726, the selected EGT/CHT bars and numbers (and the current FF number) are displayed.

FIG. 5C depicts a logic structure for multiplexing thermocouple resistance measurements.

At FIG. 5C, initial housekeeping testing and initialization are performed at 800, 802. Then a TC channel is selected for measurement at 804. At 806, the quiescent TC voltage is measured, a resistance test current injection pulse is initialized and the resulting TC voltage is measured. Then, using the known value of injected current I and the difference in measured voltages, TC resistance is computed (R=V/I) and the resistance data for that TC is updated. A test is made at 808 to see if the last TC channel has been measured for resistance. If not, then the TC channel number is incremented at 810 and control is turned to 806. If all TC channels have been measured, then the whole testing routine can be repeated, if desired, before the routine is exited.

FIGS. 5B and 5E have already been explained above with respect to periodic temperature variation.

Figure 5F:
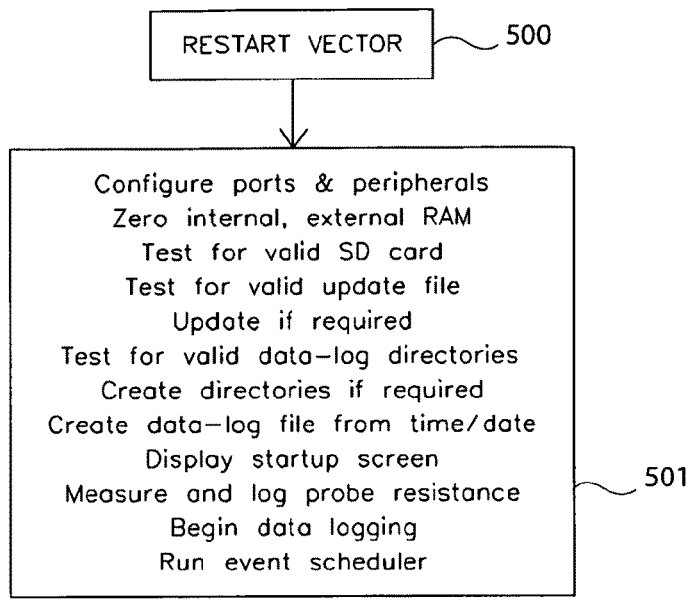
Figure 5G:
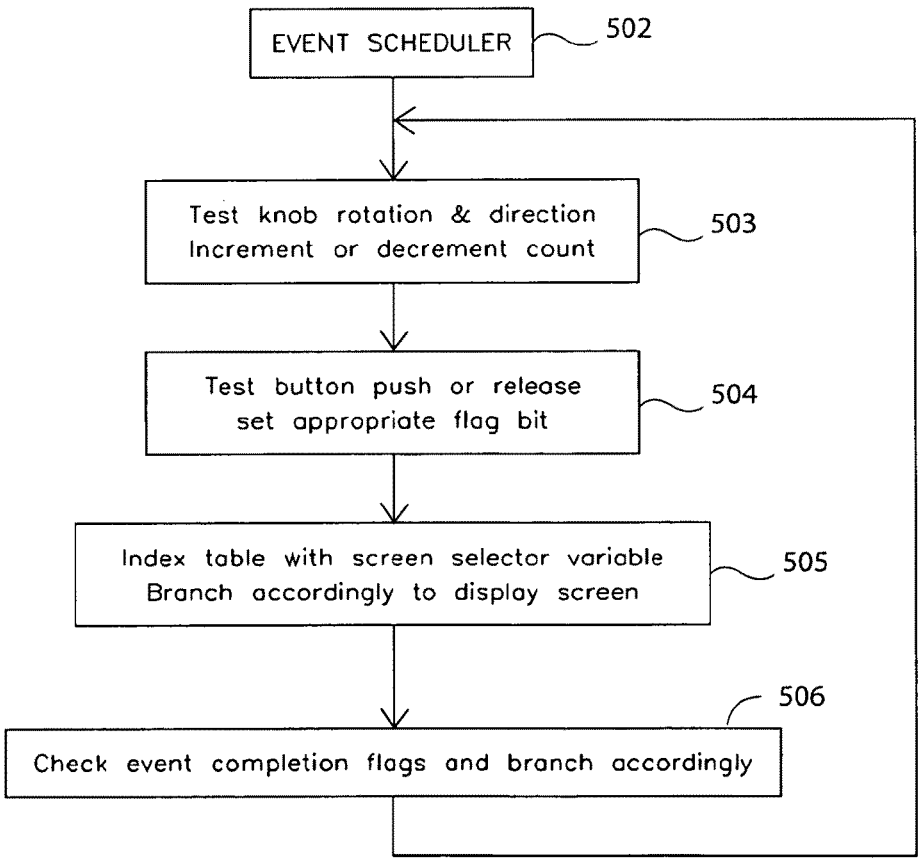

FIG. 5F is entered at restart vector 500 upon instrument "turn on." Here, numerous housekeeping and/or initialization processes are performed at 501. For example, input/output ports are configured, peripherals are configured, internal and external RAM are "zeroed." A test is made for whether or not a valid SD card is present at the removable memory card port. A test is made for the presence of a valid update file, if any, and an update is performed if required. A test is also made for valid data-log directories and new ones are created if required. A data-log file is initiated using the current time/date data. An appropriate start-up screen is output to instrument display. Thermocouple resistances are measured and logged and other data logging processes are initiated. Ultimately, the final initiation process at 501 transfers control to the event scheduler 502 shown in FIG. 5G.

In essence, the event scheduler entered at 502 provides an endless loop of instrument control functionality while the instrument remains turned "on." At 503, a test is made to detect user-controlled knob depression/rotation, direction of rotation, whether to increment or decrement associated counters and the like. As previously noted, the upper left-hand knob is primarily used to select different screens for display, while the lower left-hand knob is primarily used for control inputs from the user. For example, a test is made at 504 to detect whether a user-controlled switch button has been pushed or released and an appropriate flag bit is then set. At 505, depending upon the test results at 503 and 504, a branch is made appropriately to the selected display screen. Thereafter, at 506, checks are made to see if an event associated with that particular display screen has been completed (e.g., checking the status of event completion flags), and further branches may be made accordingly before return control is made to process 503 so as to maintain current and proper instrument control.

In the exemplary embodiment, the display only permits updating of the display buffer during certain time intervals without disrupting the desired display functionality. Accordingly, as shown at FIG. 5H, when a display sync interrupt signal is received, the appropriate routine is entered at 507 so as to reset an appropriate display interval timer at 508, thus ensuring that updates to the display buffer will only be made in proper synchronization with the display functionality.

FIGS. 5I and 5J describe serial buss (e.g., RS232) interrupts. For example, at UART interrupt 0, a routine is entered at 509 so as to store GPS serial data in a circular buffer and set an event flag when a carriage return signal is received, as depicted at 510. Thus, data can be received from the GPS instrument on the serial buss in response to an interrupt from the GPS.

Similarly, as depicted at 511 in FIG. 5J, an interrupt may be received from the air data computer which causes a relevant incoming data (e.g., true air speeds (TAS) serial data) to be stored in an associated circular buffer. The appropriate event flag is also set to terminate this communication session when a carriage return signal has been received, as will be appreciated by those in the art.

Communications to and from the SD card are also handled on an interrupt basis at 513 upon the occurrence of an SPI buss interrupt, whereupon the appropriate SD card data transfers are effected at 514.

Figure 5L:
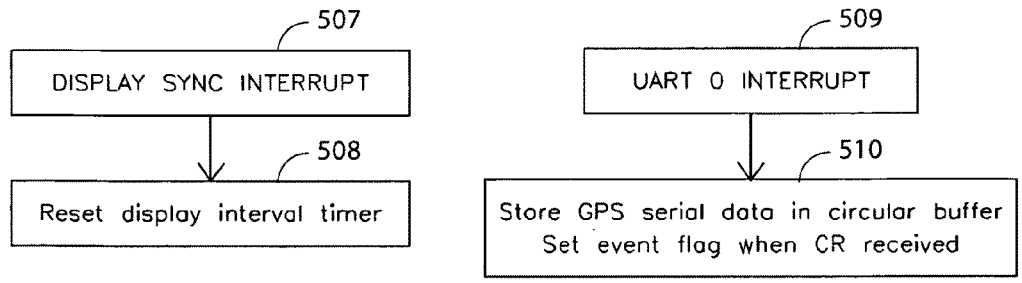
Figure 5L:
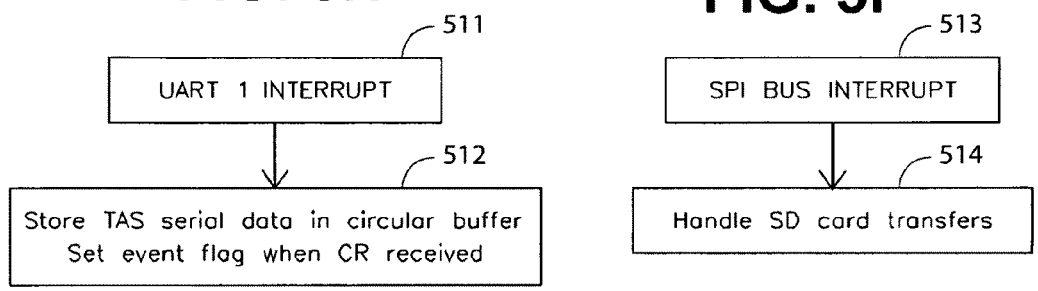
Figure 5L:
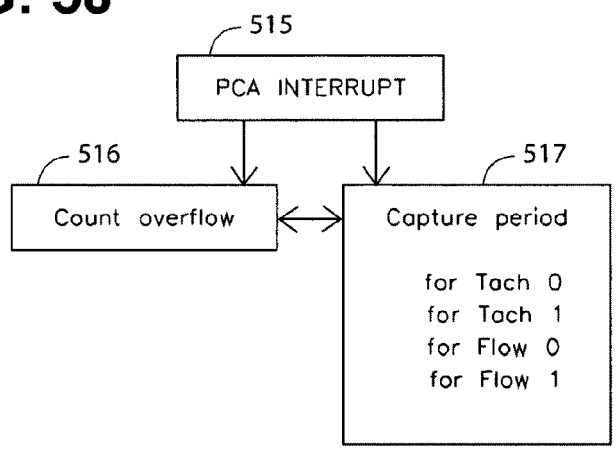
Figure 5M:
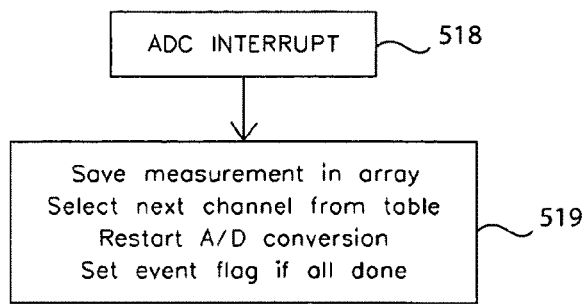

At FIG. 5L, a programmed counter array interrupt routine is entered at 515. In the exemplary embodiment, timing is achieved by capturing a running counter content at particular times and then performing appropriate arithmetic to determine elapsed time from, to or between desired events. In order to account for counter overrun/restart, a carry bit or count overflow bit is maintained at 516 so as to permit the appropriate modulo arithmetic to be maintained even when the maximum counter content has been exceeded since the last sampling or capture time. For example, time periods are captured at 517 for various tachometer states and flow meter states.

Analog-to-digital conversion interrupts are also handled in the routine at 518. Here, an incoming digital measurement is saved at 519 at an appropriate place in an array of saved digital values. A next channel, if any, is selected from an appropriate table and the A/D conversion process is then restarted for a next period. If a given event is finished, then an event flag representing that fact may be appropriately set, as will be understood by those in the art.

If the engine management screen has been selected, then an appropriate branch will be made to the routine 520 as depicted at FIG. 5N. Here, an array of thermocouple voltages is filled and converted to corresponding temperature values. The bar height to be displayed is calculated based on such temperature values. CHT values are tested against limit values so as to select the appropriate color for display. The columns and associated temperature are displayed for each cylinder/turbocharger in turn for all EGT/CHT/TIT values. The peak EGT indicator is also displayed and temperature values in digital form are displayed as well. Column numbers are labeled appropriately to correspond with cylinders. Any desired parameters may be selected for display (e.g., at least three of available data parameters and, in the exemplary embodiment, preferably six parameters such as manifold pressure (MP), fuel flow (FF), engine RPM, etc.).

If the user has selected the probe diagnostic screen, then a branch is taken to the logic structure at 521 shown in FIG. 5O. Here, a measure resistance flag is set so as to initiate a thermocouple resistance measuring routine where an appropriate array of resistance values is filled and tested against predetermined limitations. Appropriate resistance values are then displayed for each thermocouple based upon the predefined limit tests with appropriate colors associated with the displayed numerical values as to whether or not the displayed value is outside the limits (e.g., red) or inside the limits (e.g., green). An opportunity is also given to read the lower control knob and switch button and to adjust any desired user-defined limitations appropriately.

A temperature variation analysis 522 is shown in FIG. 5P. Here, the EGT values are sampled and buffered once per second. Fast Fourier Transform spectral analysis is performed and the resulting spectrum is displayed for all or a selected one cylinder(s). Here, again, in the context of this particular screen, the user-controlled lower knob and push-button switch are inspected and any appropriate adjustment of user-defined inputs (e.g., cylinder numbers for analysis) are accepted.

A vibration analysis routine 523 is depicted at FIG. 5Q. Here, the vibration measurements are preferably synchronized with engine RPM so as to stabilize the vibration analysis output displays. In the exemplary embodiment, it is desired to effect sixteen measurements per revolution. Accordingly, the appropriate sampling interval for spectrometer output must be recalculated to reflect the current engine RPM and then to instruct an addressed accelerometer with respect to the desired start time and sampling period to be currently used for sending accelerometer output data back to the main processing unit for analysis. In the exemplary embodiment, a three-axis accelerometer is utilized and, therefore, x, y, z data triplets are received from the accelerometer. When the data buffer is filled with incoming samples, a Fast Fourier Transform spectral analysis is performed and the resulting spectrum displayed. Once again, an opportunity is presented for reading the current status of the lower knob and/or push-button switch so as to make user-defined adjustments (e.g., as to axis numbers the like).

The propeller balance screen logic is depicted at 524 in FIG. 5R. Here, vibration measurements are again synchronized with respect to current engine RPM. X, y, z data triplets are then received from the properly instructed accelerometer and a Fast Fourier Transform spectral analysis is performed when the appropriate data buffer is full. The complex pair of values (imaginary and real parts) for the current fundamental harmonic is then isolated. A vector sum is used to obtain the magnitude of the fundamental spectral component and the angle is obtained by taking the arc tangent of the imaginary/real components. Depending upon a predetermined weighting parameter, the magnitude can be scaled and displayed for an appropriate mass correction (e.g., at a particular rotational position on the propeller hub). The resulting magnitude and angle are displayed even if there is no scale factor available for calculating the exact mass correction needed to reduce vibrations.

A turbulence measurement may also be maintained and displayed at logic 525. Here, accelerometer outputs are measured in two axes and stored in a circular buffer. For display, those buffers are scanned for maximum value and scaled appropriately so as to fit the display screen. The turbulence display is presented as a line graph. The object is to, of course, minimize deviations from a straight line display.

Fuel Management/Horsepower Calculation

Proper adjustment of engine fuel flow is critical to aircraft engine operation. Operation outside of established specifications may violate the manufacturer's type design data under which the engine was originally certified and may cause severe damage to the engine.

A typical 75% power plot (FIG. 7) shows that fuel can be leaned from a full rich fuel flow of 21.6 GPH to 18.0 GPH for best power (75° EGT rich of first cylinder to exhibit its EGT peak during leaning). For improved fuel economy, the fuel flow can be further leaned to 14.3 GPH (50° EGT lean of last cylinder to peak). Note, on this example, corrected brake horsepower is reduced approximately 10% at best economy versus the best power fuel flow setting. Cylinder position tuned fuel injector nozzles allow the pilot to lean the fuel flow for optimum engine operating results LOP.

There is no direct way to accurately determine aircraft engine horsepower in flight unless engine torque and RPM are known. While in-flight torque measurement is possible, it is currently impractical for small aircraft. Less accurate, but still useful, methods of horsepower determination are nevertheless available.

Aircraft engines typically have a manual fuel mixture control and can operate over a range of FF settings. A desired mixture setting is often defined by exhaust gas temperature. As the mixture of a too-rich engine is reduced, the EGT rises until a maximum (i.e., peak) is reached and then falls with further mixture reduction. The maximum temperature (called peak EGT) is attained when the optimum (stoichiometric) balance of fuel and air is achieved. At settings richer than this, the available oxygen is less than that required for complete combustion. The engine exhaust, therefore, contains some excess fuel, but no excess oxygen. At settings leaner than peak, the opposite is true where excess oxygen is available (i.e., to more than completely combust the fuel). Here at LOP, the engine exhaust contains no extra fuel, but some excess oxygen.

When operating under engine conditions of peak EGT or leaner than peak, all the available fuel is consumed and contributes to horsepower. Under these conditions, HP is directly proportional to fuel flow. This simple relationship is used in the exemplary embodiment to calculate HP under these conditions.

When operating richer than peak EGT, some fuel goes to waste and does not contribute to power generation. This is demonstrated by the power versus fuel flow curve in FIG. 7 being essentially flat on the rich side of peak EGT. If the simple relationship for lean of peak operation were used on the rich side, it would incorrectly indicate an ever increasing HP even after the actual horsepower had leveled off.

Figure 7:
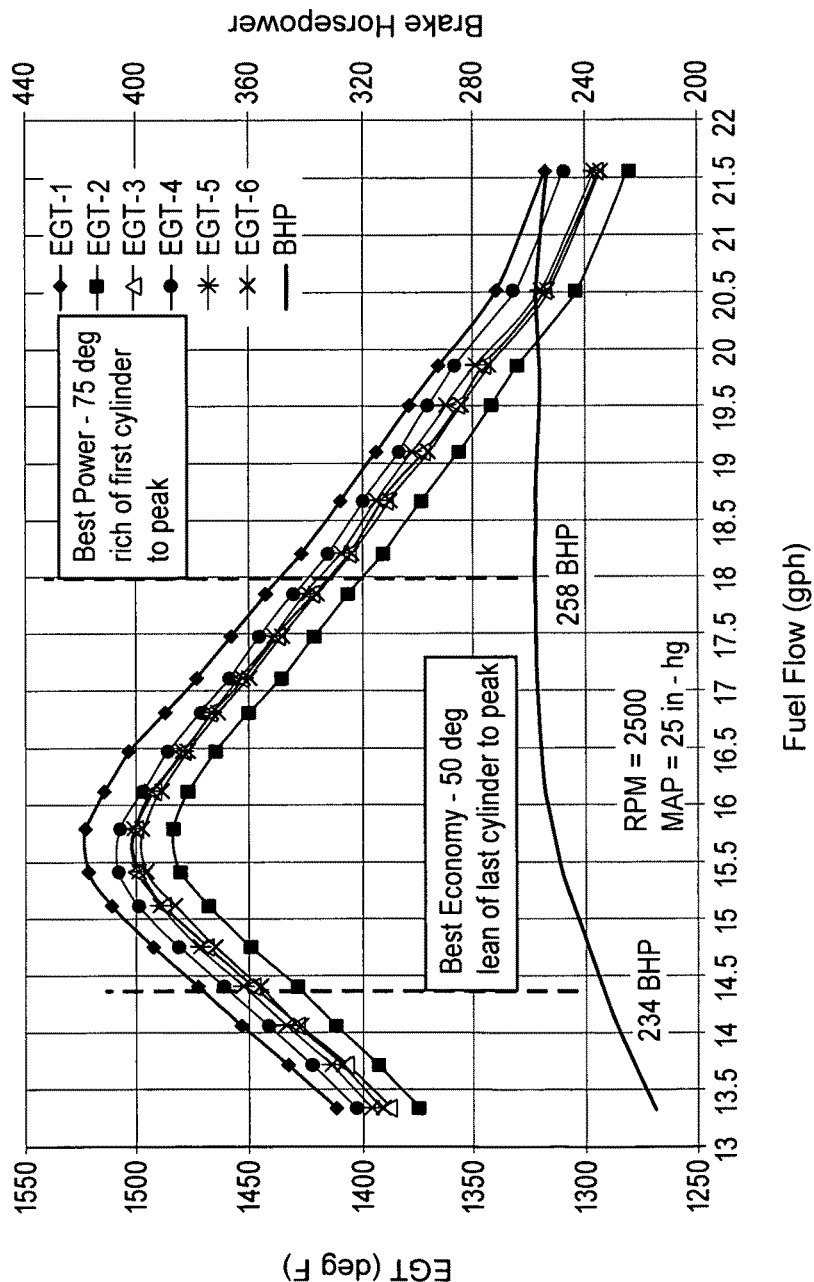
FIG. 7 depicts typical aircraft engine performance at 2500 RPM constant speed and 75% of maximum horsepower operation.

Two correction methods for this error are used in the exemplary embodiment depending on whether or not the engine has recently been leaned to peak EGT. If a recent peak EGT is known, then it is used. Otherwise, an estimate based on previous operation is used. Once the engine is leaned to peak EGT, the estimate is replaced with actual data. In either case, the current EGT is subtracted form the actual or estimated peak temperature to calculate the distance (in degrees) from peak EGT. This temperature distance is scaled and subtracted from the HP provided by the lean of peak relationship described above. The overall effect of this is to flatten the HP versus fuel flow curve on the rich side of peak to model expected actual engine behavior as shown in FIG. 7.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft monitoring instrument configured for mounting in an aircraft operator's panel for viewing by an aircraft pilot during flight, said instrument comprising:
    a multi-color video display screen configured to be mounted in an aircraft panel visible to an aircraft pilot during flight; and
    a programmed data processor connected to drive said video display screen based on received signals representing fuel flow (FF) to plural combustion cylinders of an aircraft piston engine and exhaust gas temperature (EGT) for each said cylinder;
    said data processor being configured to display for viewing by a pilot:
        (a) a graphic bar on said screen for each said combustion cylinder of current EGT for each said combustion cylinder,
        (b) an indication on said screen representative of prior FF which occurred during an engine fuel leaning process when each respective cylinder reached its peak EGT.

2. An aircraft monitoring instrument as in claim 1, wherein:
    said programmed data processor is also connected to receive signals representing cylinder head temperature (CHT) for each said cylinder and is configured to also display a graphic bar on said screen of CHT for each combustion cylinder.

3. An aircraft monitoring instrument as in claim 1, wherein said data processor is configured to simultaneously display on said screen, for each cylinder, said indication representative of FF which occurred during an engine fuel leaning process when that respective cylinder reached its peak EGT.

4. An aircraft monitoring instrument as in claim 3, wherein said data processor is configured to display each said indication as a digital numeric value of FF in visual association with its respectively corresponding cylinder's graphic bar display of EGT.

5. An aircraft monitoring instrument as in claim 3, wherein said data processor is configured to display each said indication as a value of at least one of: (i) actual FF at peak EGT, (ii) variation of FF between actual FF at peak EGT and FF occurring at another point in time, (iii) a percentage of nominal, expected, recommended or actual FF measured at a predetermined time or condition, and (iv) an engine operating parameter other than FF, but related to and thus representative of FF.

6. An aircraft monitoring instrument as in claim 1, wherein said programmed data processor is configured to display said indication representative of FF which occurred during an engine leaning process as an analog-type non-numeric graphic display on said screen.

7. An aircraft monitoring instrument as in claim 1, wherein said data processor is configured to also display:
    (c) a digital numeric display for each said combustion cylinder of its actual EGT variation from its peak EGT.

8. An aircraft monitoring instrument as in claim 7, wherein said digital numeric display of actual EGT variation includes an indication identifying whether such displayed actual EGT variation is rich of peak (ROP) or lean of peak (LOP).

9. An aircraft monitoring instrument as in claim 7, further comprising:
    a user controllable input to the data processor configured to set a threshold value of EGT variation from peak EGT corresponding to a user's desired fuel leaning for engine operation; and
    wherein said data processor is configured to also display for each said combustion cylinder an indication of whether the displayed actual EGT variation for that cylinder is above or below the set threshold variation value.

10. An aircraft monitoring instrument as in claim 9, wherein said indication of whether the displayed actual EGT variation is above or below the set threshold amount includes a color-coded display, a first color being used to indicate actual EGT variation in excess of the set threshold value and a second color being used to indicate actual EGT variation less than the set threshold value.

11. An aircraft monitoring instrument as in claim 2, wherein the graphic bar display for each cylinder comprises superimposed bars of different width and color respectively representing CHT and EGT.

12. An aircraft monitoring instrument as in claim 11, wherein the graphic bar display for each cylinder comprises a superimposed maximum desired "red line" CHT line of a contrasting color disposed across a bar representing EGT, which EGT bar is wider than a superimposed bar representing CHT.

13. An aircraft monitoring instrument as in claim 12, wherein the display for each cylinder includes a color-coded digital numeric display of actual EGT and CHT values below its respective graphic bar display of EGT and CHT.

14. An aircraft monitoring instrument as in claim 13, wherein the display includes a graphic bar and digital value display for turbine inlet temperature (TIT) of each turbocharger, if any, utilized by the monitored piston engine.

15. An aircraft monitoring instrument as in claim 1, wherein said display further includes a sustained digital display of additional engine operating parameters including at least three of:
    manifold pressure,
    RPM,
    fuel flow,
    bus voltage,
    oil temperature,
    outside air temperature,
    theoretical horsepower,
    fuel endurance,
    fuel used,
    fuel remaining,
    fuel endurance per tank,
    fuel used per tank,
    fuel remaining per tank,
    total flight time remaining,
    flight time remaining per tank, and
    guidance fuel flow.

16. An aircraft monitoring instrument as in claim 1, further comprising:

a fuel flow transducer configured to monitor in real-time a quantity of fuel flowing to combustion cylinders of an aircraft piston engine; and thermocouple probes disposed to individually monitor at least the EGT associated with each said combustion cylinder.

17. An aircraft monitoring instrument as in claim 16, further comprising:

at least one accelerometer mounted on said engine and thereat co-located with signal processing circuits which are configured to provide a succession of digital data representing real-time acceleration of engine mass vibrations for output to said programmed data processor; and at least one engine revolution position detector providing an engine revolution position trigger signal that is synchronized with a predetermined rotational position of the piston engine;

wherein said programmed data processor is configured to also display a relative magnitude and phase angle for detected vibrations occurring at engine rotational frequency and related to dynamic propeller balance.

18. An aircraft monitoring instrument as in claim 17, wherein said engine revolution position detector comprises a spark plug firing time detector co-located with a spark plug wire for a predetermined engine cylinder and coupled to at least a center conductor of a shielded cable carrying electrical spark ignition power to the spark plug.

19. An aircraft monitoring instrument as in claim 18, wherein said spark plug firing time detector is electrostatically coupled to said center conductor within a shielded adapter housing affixed within shielded spark plug components.

20. An aircraft monitoring instrument as in claim 18, wherein said spark plug firing time detector is inductively coupled to said center conductor via at least one conductive turn about a ferrite toroid encompassing said center conductor with a shielded adapter housing affixed within shielded spark plug components.

21. An aircraft monitoring instrument as in claim 18, wherein said spark plug firing time detector comprises:

a longitudinally-split metal adapter housing of at least two pieces configured to be threadably interposed between a spark plug main body and a spark plug cap, said adapter housing having internal threads at a distal end for mated engagement with external threads on a proximal end of the spark plug main body, said adapter housing also having an annular internal wedge-shaped lip on each of its at least two pieces, said internal lip engaging a cylindrical inside proximal end of the spark plug main body and thereby wedging said at least two pieces into increasing engagement with each other as the adapter's distal end internal threads are screwed further onto the proximal mated externally threaded end of the spark plug main body.

22. An aircraft monitoring instrument as in claim 1, further comprising:

a thermocouple (TC) probe resistance measuring circuit configured to inject a predetermined current into at least one thermocouple lead and to supply a resultant respectively corresponding measured voltage related to a corresponding measured TC resistance parameter.

23. An aircraft monitoring instrument as in claim 22, wherein said thermocouple probe resistance measuring circuit comprises a capacitor connected to inject a controlled current of controlled polarity into a respectively corresponding positive or negative thermocouple lead and to measure a respectively corresponding resulting voltage associated therewith.

24. An aircraft monitoring instrument as in claim 23, wherein said programmed data processor is configured to display measured thermocouple resistance values for at least one thermocouple probe supplying data to the programmed data processor.

25. An aircraft monitoring instrument as in claim 24, wherein said display of measured thermocouple resistance values is color-coded to indicate which, if any, are of suspect thermocouple condition.

26. An aircraft monitoring instrument as in claim 22, wherein said programmed data processor is configured to automatically log stored values for measured thermocouple resistances for all connected thermocouple probes at least once per aircraft flight.

27. An aircraft monitoring instrument as in claim 1, further comprising an engine mounted module containing:

a fuel flow transducer; and an acceleration transducer, analog-to-digital converter and a local data processing circuit connected to provide processed digital data over a digital data transmission path to another remotely located data processor.

28. An aircraft monitoring instrument as in claim 1, wherein said programmed data processor is configured to derive and display an EGT frequency spectral analysis including low frequencies corresponding to engine exhaust valve rotation cycles per minute during engine operation.

29. An aircraft monitoring instrument as in claim 1, further comprising:

an internal pressure sensor providing aircraft cabin atmospheric pressure data to said programmed data processor which is configured to log such data in correlation with other logged aircraft and/or engine operating conditions during aircraft flight.

30. An aircraft monitoring instrument as in claim 1, further comprising:

an internal pressure sensor connected in operation to monitor aircraft vacuum pressure available to power certain other aircraft instruments, said programmed data processor being configured to display at least an alarm when vacuum pressure falls below a preset minimum value.

31. An aircraft monitoring instrument as in claim 1, further comprising:

an internal accelerometer providing data representing aircraft airframe movements to said programmed data processor which is configured to log such data in correlation with other logged aircraft and/or engine operating conditions during aircraft flight.

32. An aircraft monitoring instrument as in claim 1, further comprising:

a removable data storage device connectable via a plug-in socket to said programmed data processor, which processor is configured to display on said video display screen audio-video presentations stored on said removable data storage device, said programmed data processor also being connectable in operation to aircraft audio output circuits for output of an audio portion of said presentation, if any.

33. An aircraft monitoring instrument as in claim 1, further comprising:

a data communication port for connection of said programmed data processor to receive outputs of at least one of (i) an air data computer (ADC) and (ii) a global positioning satellite (GPS) receiver; and wherein said programmed data processor is configured to log data from said communication port during flight.

34. An aircraft monitoring instrument as in claim 1, further comprising:
a fuel tank selection switch input port for connection, in operation, of said programmed data processor to an external circuit providing a signal indicating which of plural aircraft fuel tanks is currently providing fuel to the engine; and
wherein said programmed data processor is configured to provide fuel tank data separately for each one of said plural fuel tanks and to display such separately provided fuel tank data on said video display screen, said fuel tank data presenting at least one of: (i) fuel remaining in each fuel tank, (ii) fuel used from each fuel tank, (iii) total fuel remaining in all tanks, (iv) total fuel used from all tanks, (v) flight time remaining for fuel remaining in each tank, and (vi) flight time remaining for total fuel remaining in all tanks.

35. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen to display engine temperature data based on received signals from each of plural thermocouples during aircraft flight; and
a thermocouple probe resistance measuring circuit configured to inject a predetermined current into a lead of at least one said thermocouple during aircraft flight and to measure a related voltage value supplied to said programmed data processor also during aircraft flight, said processor being configured to derive and display a thermocouple resistance value based on said predetermined current and said measured voltage thereby providing a concurrent indication of thermocouple temperature measurement integrity during aircraft flight.

36. An aircraft monitoring instrument as in claim 35, wherein said predetermined current is injected and a resulting voltage value is measured simultaneously with provision of a temperature measuring thermocouple voltage value from the same thermocouple.

37. An aircraft monitoring instrument as in claim 35, wherein said thermocouple probe resistance measuring circuit comprises a capacitor connected to inject a controlled current (I) of controlled polarity into a respectively corresponding positive or negative thermocouple lead and to measure a respectively corresponding resulting voltage (V) associated therewith.

38. An aircraft monitoring instrument as in claim 37, wherein said programmed data processor is configured to display measured thermocouple resistance values for each thermocouple probe supplying data to the programmed data processor.

39. An aircraft monitoring instrument as in claim 38, wherein said display of measured thermocouple resistance values is color-coded to indicate which, if any, are of suspect thermocouple condition.

40. An aircraft monitoring instrument as in claim 35, wherein said programmed data processor is configured to automatically log stored values for measured thermocouple resistances for all connected thermocouple probes at least once per aircraft flight.

41. An aircraft monitoring instrument configured for mounting in an aircraft operator's panel for viewing by an aircraft pilot during flight, said instrument comprising:
a display screen mounted, in use, for observation by an aircraft pilot during flight;
a programmed data processor connected to drive said display screen based on received signals; and
an aircraft engine mounted module containing:
a fuel flow transducer configured to quantitatively detect and measure a quantity of fuel flowing to said aircraft engine during aircraft flight;
an acceleration transducer configured to quantitatively detect and measure multi-axis accelerations of said aircraft engine during aircraft flight; and
an analog-to-digital converter and local data processing circuit configured to arrange digital output from said converter into data sets which respectively correspond to the multi-axis accelerations and to provide the data sets of digital data to said programmed data processor which transforms the received data sets into a visual display of said multi-axis accelerations of said aircraft engine.

42. An aircraft monitoring instrument configured for mounting in an aircraft operator's panel for viewingby an aircraft pilot during flight, said instrument comprising:
a display screen configured to be mounted in an aircraft panel visible to an aircraft pilot during flight;
a programmed data processor connected to drive said display screen based on received signals; and
wherein said programmed data processor is configured to derive and display during aircraft flight exhaust gas temperature (EGT) frequency spectral analyses for respective cylinders of a reciprocating aircraft internal combustion engine during aircraft flight including low frequencies corresponding to engine exhaust valve rotation cycles per minute during engine operation.

43. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen based on received signals; and
an internal-to-the-panel-mounted-instrument pressure sensor configured to provide ambient atmospheric pressure data representative of aircraft altitude during aircraft flight to said programmed data processor which processor is configured to log such aircraft altitude data in correlation with other logged aircraft and/or engine operating conditions during aircraft flight.

44. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen based on received signals; and
an internal-to-the-panel-mounted-instrument pressure sensor connected in operation to monitor aircraft vacuum pressure available from at least one airplane-mounted vacuum pump to power at least one predetermined aircraft instrument,
said programmed data processor being configured to display during aircraft flight an alarm when the monitored vacuum pressure falls below a preset minimum value.

45. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;

a programmed data processor connected to drive said display screen based on received signals; and
an internal-to-the-panel-mounted-instrument accelerometer providing data representing instrument movements and thus the thereto affixed aircraft airframe accelerometer data to said programmed data processor which is configured to log such aircraft airframe accelerometer data in correlation with other logged aircraft and/or engine operating conditions during aircraft flight.

46. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen based on received signals representing monitored aircraft engine operating parameters during aircraft flight; and
a removable data storage device connectable via a plug-in socket to said programmed data processor, which processor is configured to display on said display screen, visible to an aircraft operator, audio-video presentations stored on said removable data storage device, said programmed data processor also being connectable in operation to aircraft audio output circuits for output of an audio portion of said presentation, if any.

47. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen based on received signals representing monitored aircraft engine operating parameters during aircraft flight; and
a data communication port for connection of said programmed data processor to receive outputs during aircraft flight of at least one of (i) an air data computer (ADC) and (ii) a global positioning satellite (GPS) receiver; and
wherein said programmed data processor is configured to log data from said communication port during flight.

48. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen based on received signals; and
a fuel tank selection switch input port for connection, in operation, of said programmed data processor to an external circuit providing a signal indicating which of plural aircraft fuel tanks is currently providing fuel to the engine; and
wherein said programmed data processor is configured to maintain fuel tank data separately for each one of said plural fuel tanks based on said provided signal and to display separate fuel tank data on said display screen based on said separately maintained data.

49. An aircraft monitoring instrument as in claim 48, wherein said displayed fuel tank data represents at least one of: (i) fuel remaining in each fuel tank, (ii) fuel used from each fuel tank, (iii) total fuel remaining in all tanks, (iv) total fuel used from all tanks, (v) flight time remaining for fuel remaining in each tank, and (vi) flight time remaining for total fuel remaining in all tanks.

50. An aircraft monitoring instrument configured for mounting in an aircraft operator's panel for viewing by an aircraft pilot during flight, said instrument comprising:
a display screen configured to be mounted in an aircraft panel visible to an aircraft pilot during flight;
a programmed data processor connected to drive said display screen based on received signals; and
at least one accelerometer mounted on a predetermined portion of said aircraft and co-located with signal processing circuits which provide a succession of digital data representing real-time acceleration of said predetermined portion of the aircraft to said programmed data processor; and
at least one engine rotational position detector providing an engine rotational position trigger signal that is synchronized with a predetermined rotational position of the piston engine;
wherein said programmed data processor is configured to also display a relative magnitude and phase angle for detected vibrations occurring at a harmonic of engine rotational frequency.

51. An aircraft monitoring instrument as in claim 50, wherein said predetermined portion is vibrationally coupled to at least one rotating member which rotates in synchronization with engine rotation.

52. An aircraft internal combustion piston engine rotational position detector comprising:
a spark plug firing time detector co-located with a spark plug for a predetermined piston engine cylinder and coupled to a center conductor of a shielded cable carrying electrical spark ignition power to the co-located spark plug while still maintaining the shielded condition of the center conductor,
said spark plug firing time detector providing a pulsatile electrical output timed to correspond with a predetermined rotational position of a piston engine.

53. A piston engine rotational position detector as in claim 52, wherein said spark plug firing time detector is inductively coupled to said center conductor via at least one conductive turn.

54. A piston engine rotational position detector as in claim 52, wherein said spark plug firing time detector comprises:
a longitudinally-split metal adapter housing having at least two pieces configured to be threadably interposed between a spark plug main body and a spark plug cap,
said adapter housing having internal threads at a distal end for mated engagement with external threads on a proximal end of the spark plug main body, said adapter housing also having an annular internal wedge-shaped lip on each of its at least two pieces, said internal lip engaging a cylindrical inside proximal end of the spark plug main body and thereby wedging said at least two pieces into increasing engagement with each other as the adapter internal threads are screwed further onto the external threads of a proximal mated end of the spark plug main body.

55. A thermocouple probe resistance measuring circuit which may be used concurrently with temperature measurement by the same thermocouple probe without interrupting temperature measuring thermocouple output, said resistance measuring circuit comprising:
a thermocouple probe resistance measuring circuit connected to a programmed data processor,
said resistance measuring circuit being configured to inject a predetermined current (I) into at least one thermocouple lead and to measure a measured voltage value (V) supplied to said programmed data processor, and said programmed data processor being configured to calculate both a thermocouple resistance value and a thermocouple-measured temperature value corresponding to said measured voltage (V).

56. A thermocouple probe resistance measuring circuit as in claim 55, wherein said thermocouple probe resistance measuring circuit comprises a capacitor connected to inject a controlled current of controlled polarity into a respectively corresponding positive or negative thermocouple lead and to measure a respectively corresponding resulting voltage associated therewith.

57. A thermocouple probe resistance measuring circuit as in claim 56, wherein said programmed data processor is configured to display on an output display measured thermocouple resistance values for each thermocouple probe supplying data to the programmed data processor.

* * * * *